United States Patent
Piehler et al.

(10) Patent No.: US 9,544,668 B2
(45) Date of Patent: Jan. 10, 2017

(54) OPTICAL NETWORK COMMUNICATION SYSTEM WITH OPTICAL LINE TERMINAL TRANSCEIVER AND METHOD OF OPERATION THEREOF

(75) Inventors: David Piehler, Half Moon Bay, CA (US); Anthony J. Ticknor, Cupertino, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 12/966,795

(22) Filed: Dec. 13, 2010

(65) Prior Publication Data

US 2012/0148241 A1    Jun. 14, 2012

(51) Int. Cl.

| | |
|---|---|
| *H04B 10/12* | (2006.01) |
| *H04Q 11/00* | (2006.01) |
| *H04B 10/07* | (2013.01) |
| *G02B 6/42* | (2006.01) |
| *G02B 6/28* | (2006.01) |
| *G02B 6/293* | (2006.01) |
| *G02B 6/125* | (2006.01) |
| *G02B 6/12* | (2006.01) |

(52) U.S. Cl.
CPC .......... *H04Q 11/0067* (2013.01); *G02B 6/125* (2013.01); *G02B 6/28* (2013.01); *G02B 6/2938* (2013.01); *G02B 6/4246* (2013.01); *G02B 6/4261* (2013.01); *H04B 10/07* (2013.01); *G02B 2006/1215* (2013.01); *G02B 2006/12164* (2013.01)

(58) Field of Classification Search
None
See application file for complete search history.

(56) References Cited

U.S. PATENT DOCUMENTS

| | | | |
|---|---|---|---|
| 4,909,584 A | | 3/1990 | Imoto et al. |
| 4,977,593 A | * | 12/1990 | Ballance ............ 380/2 |

(Continued)

FOREIGN PATENT DOCUMENTS

| | | |
|---|---|---|
| CN | 101022311 A | 8/2007 |
| JP | H2-007009 A | 1/1990 |

(Continued)

OTHER PUBLICATIONS

International Search Report for PCT Application No. PCT/US2011/062589 dated May 11, 2012.

(Continued)

*Primary Examiner* — Ken N Vanderpuye
*Assistant Examiner* — David Lambert
(74) *Attorney, Agent, or Firm* — Dardi & Herbert, PLLC

(57) ABSTRACT

A method of operation of an optical network communication system including: providing a planar lightwave circuit including: connecting 2×2 single-mode optical couplers in an array for forming a 1×N single-mode optical splitter/combiner, and routing harvesting ports to an optical line terminal receiver for collecting harvested-light, from two or more of the harvesting ports, in the optical line terminal receiver wherein one of more of the harvesting ports is from the 2×2 single-mode optical couplers; transmitting to an optical network unit through the planar lightwave circuit at a first wavelength; and interpreting a response from the optical network unit at a second wavelength through the harvested-light.

26 Claims, 11 Drawing Sheets

(56) References Cited

U.S. PATENT DOCUMENTS

| | | | |
|---|---|---|---|
| 5,285,305 A * | 2/1994 | Cohen et al. | 398/31 |
| 5,657,406 A | 8/1997 | Ball | |
| 5,949,931 A | 9/1999 | Kitamura | |
| 6,160,824 A * | 12/2000 | Meissner et al. | 372/7 |
| 6,411,751 B1 * | 6/2002 | Giles | G02B 6/3588 324/97 |
| 7,380,993 B2 * | 6/2008 | Dallesasse | 385/89 |
| 7,639,946 B2 | 12/2009 | Bouda | |
| 7,684,705 B2 | 3/2010 | Bouda | |
| 7,715,718 B2 | 5/2010 | Smith et al. | |
| 7,783,201 B2 | 8/2010 | Miura et al. | |
| 7,818,648 B2 | 10/2010 | Haran | |
| 7,826,378 B2 | 11/2010 | Absillis et al. | |
| 2003/0099439 A1 * | 5/2003 | Ionov | 385/48 |
| 2007/0092251 A1 | 4/2007 | Bouda et al. | |
| 2007/0133923 A1 | 6/2007 | Park et al. | |
| 2009/0003767 A1 * | 1/2009 | Al-Salameh et al. | 385/24 |
| 2009/0304384 A1 | 12/2009 | Li | |
| 2010/0067376 A1 | 3/2010 | Lee et al. | |
| 2010/0111537 A1 | 5/2010 | Cheng et al. | |
| 2010/0158516 A1 * | 6/2010 | Cook | G02B 6/4453 398/45 |
| 2011/0255866 A1 * | 10/2011 | Van Veen et al. | 398/35 |

FOREIGN PATENT DOCUMENTS

| | | |
|---|---|---|
| JP | H6-265749 A | 9/1994 |
| JP | H10-048458 A | 2/1998 |
| JP | H10-322288 A | 12/1998 |
| JP | 2010118934 A | 5/2010 |
| JP | 2010239552 A | 10/2010 |
| RU | 2347250 C1 | 2/2009 |
| WO | 89-05078 A1 | 6/1989 |

OTHER PUBLICATIONS

Office Action for RU Application No. 2013132450 Dated Jan. 22, 2015.

Extended European Search Report from EP Application No. 11 848 405.4 Dated Mar. 3, 2016.

Office Action for JP Application No. 2013-543215 dated Nov. 17, 20158.

Office Action for CN application No. 201180067424.4 dated Jan. 27, 2016.

* cited by examiner

OPTICAL NETWORK COMMUNICATION SYSTEM WITH OPTICAL LINE TERMINAL TRANSCEIVER AND METHOD OF OPERATION THEREOF

TECHNICAL FIELD

The present invention relates generally to an optical network communication system, and more particularly to a system for providing a passive optical network.

BACKGROUND ART

An example of a point-to-multipoint optical network can be the passive optical network. Passive optical networks are defined in standards, by well known organizations, for general application. The network is terminated at a single point, typically located in a telecommunications provider central office (CO), in an optical line terminal (OLT) and at multiple subscriber points, typically at the subscriber's residence, by an optical network unit (ONU).

The OLT and the ONUs have single fiber interfaces which transmit and receive optical signals at different wavelengths. The OLT transmits signals at a wavelength $\lambda_{down}$ and receives signals from the ONUs at a wavelength $\lambda_{up}$. The ONU transmits signals at a wavelength $\lambda_{up}$ and receives signals from the OLT at a wavelength $\lambda_{down}$. The downstream signal broadcasts to all ONUs on the network; while upstream signals from each subscriber ONU are assigned unique time slots according to a time division multiple access (TDMA) protocol.

To support high-data rates and long distances, between the OLT and ONUs, Passive Optical Networks (PONs) use single-mode optical fiber. A key component in any PON is a single-mode optical splitter. The function of a 1×N optical splitter is to split and direct identical copies of the downstream optical signal to each of the each of the N ONU-facing ports.

The same splitter combines N upstream signals into a single, single-mode optical port facing the OLT. The law of energy conservation requires that the downstream signal at each output port will be attenuated by at least a factor of 1/N relative to the input signal. If one assumes that all signals in the upstream are treated identically by the splitter, (i.e. the splitter has no polarization, or wavelength preferences) then a signal entering any one of the N ONU-facing ports must be attenuated by at least a factor of 1/N by the time it reaches the single OLT-facing port, as a consequence of the second law of thermodynamics (entropy cannot decrease in a closed system).

For the ideal single-mode splitter, one that has zero excess loss, the total downstream optical power launched into the splitter is equal to the total power emitted from the N ONU-facing ports. For the same ideal splitter, the total optical power flowing out of the single OLT-facing upstream port can be no more than 1/N times the total optical power launched into any set the N ports. A very large fraction, (N−1)/N of the upstream signal is radiated out of the single mode waveguides in the splitter as dispersed and unusable light energy, which will be called waste-light.

Thus, a need still remains for an optical network communication system with optical line terminal transceiver that compensates for the attenuation of the upstream signal path. In view of the growth in the optical network communication industry, world-wide, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an optical network communication system including: providing a planar lightwave circuit including: connecting 2×2 single-mode optical couplers in an array for forming a 1×N single-mode optical splitter/combiner, and routing harvesting ports to a receiver for collecting harvested-light, from two or more of the harvesting ports, in the receiver wherein one of more of the harvesting ports is from the 2×2 single-mode optical couplers; transmitting to an optical network unit through the planar lightwave circuit at a first wavelength; and interpreting a response from the optical network unit at a second wavelength through the harvested-light.

The present invention provides an optical network communication system including: a planar lightwave circuit includes: 2×2 single-mode optical couplers coupled in an array form a 1×N single-mode optical splitter/combiner, and harvesting ports routed to a receiver for collecting harvested-light, from two or more of the harvesting ports, in the receiver wherein one of more of the harvesting ports is from the 2×2 single-mode optical couplers; an optical line terminal transmitter for transmitting a first wavelength to an optical network unit through the planar lightwave circuit; and a second wavelength, from the optical network unit, received through the harvested-light.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
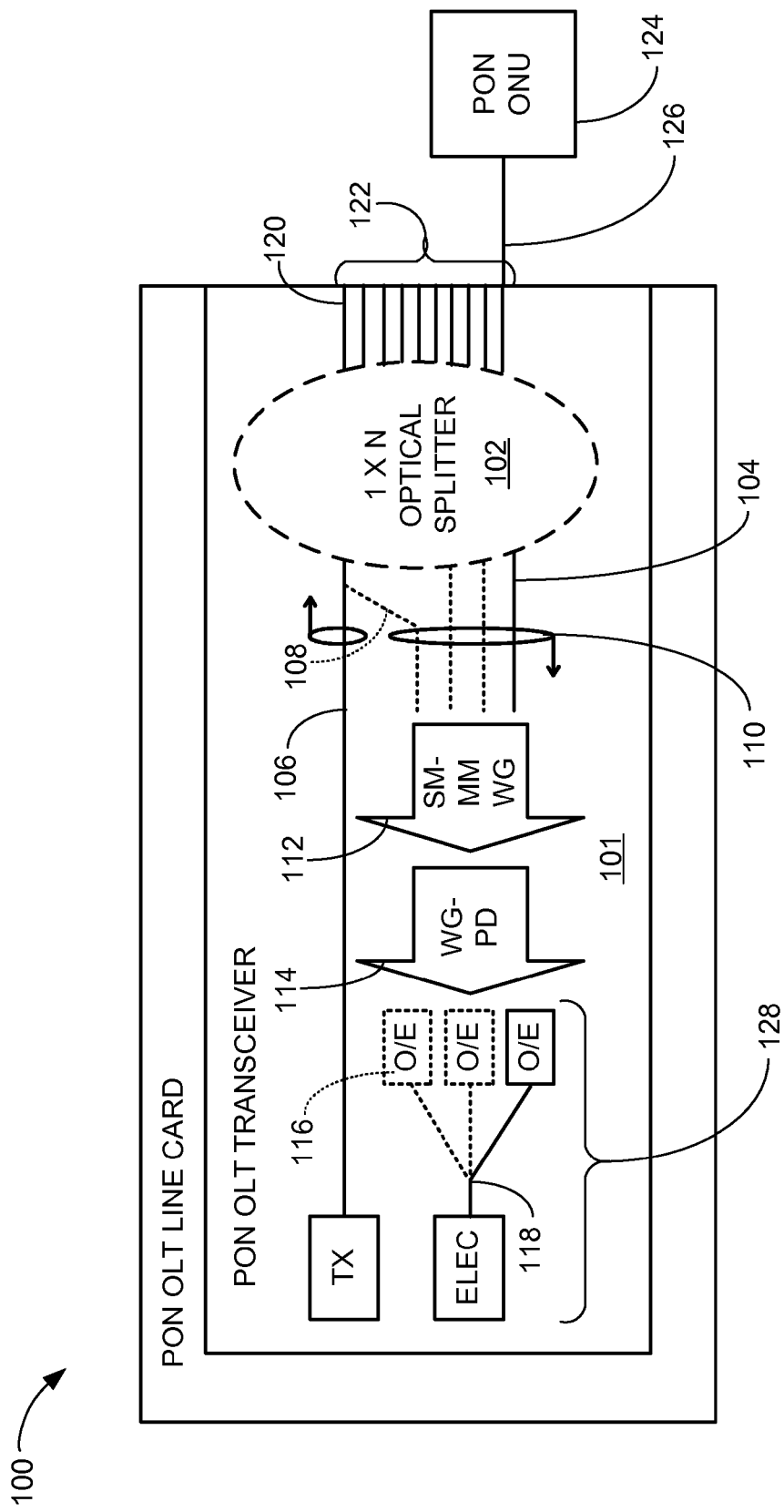
FIG. 1 is a functional block diagram of an optical network communication system, with optical line terminal transceiver, in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements. The term waste-light is defined as the light that is diffused from an optical junction in prior art splitters. For purposes of this application harvested-light is not diffused in the current invention but is rather collected or redirected for use by the receiver of the present invention. The term harvesting port is defined to be the extra port of a 2×2 single-mode optical coupler or a wavelength division multiplexer that is used for collecting or redirecting the harvested-light.

Referring now to FIG. 1, therein is shown a functional block diagram of an optical network communication system 100, with optical line terminal transceiver 101, in an embodiment of the present invention. The functional block diagram of the optical network communication system 100 depicts a 1×N single-mode optical splitter/combiner 102 that has at least two single-mode optical ports, such as a first single-mode optical port 104 and a second single-mode optical port 106 on the Optical Line Terminal-facing side. The second single-mode optical port 106, is the input to the 1×N single-mode optical splitter/combiner 102 and may be coupled to an optical transmitter of an optical line terminal (not shown).

In addition to the first single-mode optical port 104, at least one additional port 108 may be directed through a multi-port single-mode group 110, such as a group of optical fibers or optical waveguides, is directed toward photo-detectors 116, in the optical line terminal, for harvesting upstream light. One of the additional ports of the single-mode group 110, may be derived from the second single-mode optical port 106 by wavelength division multiplexing (WDM), for example. The upstream signals in the first single-mode optical port 104 and the multi-port single-mode group 110 are derived at least partially from collecting the harvested-light that would otherwise be dispersed from a prior art splitter, as waste-light, may now be harvested in the 1×N single-mode optical splitter/combiner 102.

Upstream signals from the first single-mode optical port 104 and the multi-port single-mode group 110 are transported toward the photo-detectors 116. The upstream signals may traverse the multi-port single-mode group 110 or they may be efficiently coupled to one or more multi-mode optical waveguides 112 with low loss. The multi-mode optical waveguides 112 may transport the upstream signals through optical couplers 114, with low loss to the upstream signals. The optical couplers 114 may deliver the upstream signals directly to one or more of the photo-detectors 116 by a combination of the multi-mode optical waveguides 112 and/or the multi-port single-mode group 110.

The upstream signals from the single multi-mode optical waveguide 112 are coupled to the photo-detectors 116, labeled "O/E", having active detection area(s), not shown, substantially larger than the square of the signal wavelength measured in nano-meters. The coupling of the upstream signals to the photo-detectors 116 may be achieved by proximity, refractive optics (i.e. lenses), reflective surfaces, or diffractive optics.

If there are two or more of the photo-detectors 116, an electrical bus 118 is combined by means of analog or digital circuitry (not shown). The electrical bus 118 may be suitable for manipulation by a processor (not shown).

The present invention can be implemented in such a way that any upstream signals, such as optical signals, entering at an ONU-facing port 120, which are directed to one or more of the photo-detectors 116 by more than one distinct optical path satisfying the following requirement:

N ONU-facing optical ports 122 may form an egress path for optical network units (ONU) 124, coupled by single-mode optical fiber 126, that are communicating through the optical network communication system 100. The combination of optical, electro-optical and electronic elements described above must be designed such that the time for an upstream signal from any particular one of the N of the ONU-facing optical ports 122 to travel along the multiple possible distinct optical paths to the electrical bus 118 must be "equal to each other" with a tolerance substantially smaller than the reciprocal of the electrical bandwidth of the signal N is greater than 2.

Or, in mathematical terms, the overall design must satisfy the following:

$$|T_1 - T_2| \ll 1/B_e \qquad \text{EQ 1}$$

For all signal paths originating at any one particular port of the N ONU-facing optical ports 122.

Where:

$T_1$=time to travel from any of the N of the ONU-facing optical ports 122 to the electrical bus 118 via a distinct path through the multi-port single-mode group 110.

$T_2$=time to travel from that same N of the ONU-facing optical port 122 to the electrical bus 118 via a different distinct path through the multi-port single-mode group 110.

$B_e$=the electrical signal bandwidth

The present invention places no limitations on the physical distribution of its constituent parts, so long as the design rules are preserved. Accordingly, certain embodiments may physically separate constituent parts and/or locate them in distinct modules. In the examples illustrated below, the passive optical functions may be isolated to separate modules.

It has been discovered that by collecting the harvested-light from the 1×N single-mode optical splitter/combiner 102, a simplification of an optical line terminal receiver 128 that interprets the electrical bus 118 is possible. The simplification may translate to a reduction in cost and an increase in data reliability as reflected by the reduction in the bit error ratio.

Figure 2:
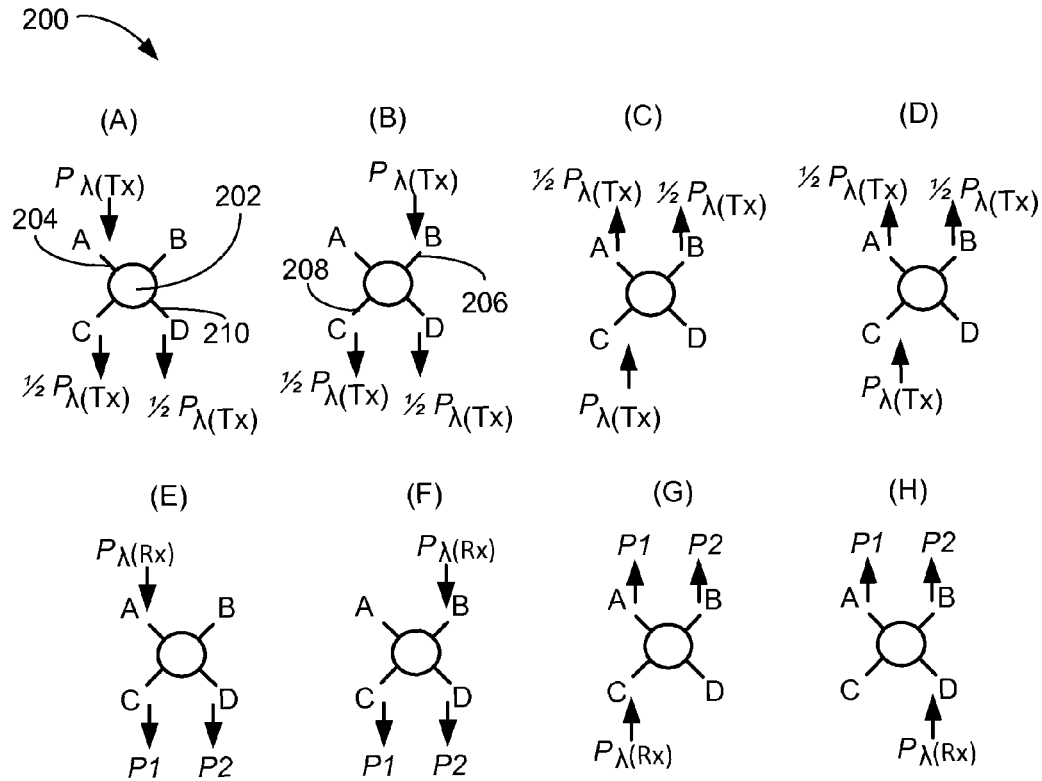
FIG. 2 (A-H) is a functional block diagram of a 2×2 single-mode optical couplers having a characteristic response to input wavelengths.

Referring now to FIG. 2 (A-H), therein is shown a functional block diagram of a 2×2 single-mode optical coupler 202 having a characteristic response to input wavelengths. The functional block diagram of the 2×2 single-mode optical couplers 202 depicts that each of the 2×2 single-mode optical couplers 202 includes an A port 204, a B port 206, a C port 208, and a D port 210. It is understood that the 2×2 single-mode optical couplers 202 are optical couplers that transmit light of a certain wave length ($\lambda$) as defined below.

The 2×2 single-mode optical couplers 202 are used as a key building block of the 1×N single-mode optical splitter/combiner 102, of FIG. 1. The 2×2 single-mode optical couplers 202 can be fabricated from fused-fiber, planar lightwave circuit or bulk optical technologies. For successful implementation of the 1×N single-mode optical splitter/combiner 102, the 2×2 single-mode optical couplers 202 should function as an equal-sided Y-junction at the Passive Optical Network (PON) Optical Line Terminal transmitter wavelength, $\lambda_{down}$. At the wavelength of the PON OLT receiver, $\lambda_{up}$, the specification on the coupling ratio is much more relaxed, since in the preferred embodiment, most or all paths, eventually get to the OLT receiver regardless of any particular split ratio. This is a departure from the prior art, which does not collect the harvested-light as defined in this application.

It is known by those skilled in the art that designing and fabricating a Planar Lightwave Circuit based on broadband features of the 2×2 single-mode optical couplers 202 is more challenging than one where the coupler is designed to split power equally over a narrow range of wavelengths. In this application, downstream performance is more critical than upstream performance. The basic definition of the 2×2 single-mode optical couplers 202 in the application are illustrated below:

As shown in FIG. 2(A), the power of the transmitted light $P_{\lambda(Tx)}$ entering the A port 204 of the 2×2 single-mode optical coupler 202 is equally divided and replicated on both the C port 208, and the D port 210. Each of the destination ports will propagate the light at ½ $P_{\lambda(Tx)}$.

As shown in FIG. 2(B), the power of the transmitted light $P_{\lambda(Tx)}$ entering the B port 206 of the 2×2 single-mode optical coupler 202 is equally divided and replicated on both the C port 208, and the D port 210. Each of the destination ports will propagate the light at ½ $P_{\lambda(Tx)}$.

As shown in FIG. 2(C), the power of the transmitted light $P_{\lambda(Tx)}$ entering the C port 208 of the 2×2 single-mode optical coupler 202 is equally divided and replicated on both the A port 204, and the B port 206. Each of the destination ports will propagate the light at ½ $P_{\lambda(Tx)}$.

As shown in FIG. 2(D), the power of the transmitted light $P_{\lambda(Tx)}$ entering the D port 210 of the 2×2 single-mode optical couplers 202 is equally divided and replicated on both the A port 204, and the B port 206. Each of the destination ports will propagate the light at ½ $P_{\lambda(Tx)}$.

As shown in FIG. 2(E), the power of the received light $P_{\lambda(Rx)}$ entering the A port 204 of the 2×2 single-mode optical couplers 202 is arbitrarily divided between the C port 208, and the D port 210. Each of the destination ports will propagate a complimentary portion the light at P1 and P2, where:

$$P1 + P2 = P_{\lambda(Rx)} \qquad \text{EQ 2}$$

with $$P1 \geq 0.05 P_{\lambda(Rx)} \qquad \text{EQ 3}$$

and $$P2 \geq 0.05 P_{\lambda(Rx)} \qquad \text{EQ 4}$$

As shown in FIG. 2(F), the power of the received light $P_{\lambda(Rx)}$ entering the B port 206 of the 2×2 single-mode optical couplers 202 is arbitrarily divided between the C port 208, and the D port 210. Each of the destination ports will propagate a complimentary portion the light at P1 and P2, as defined above.

As shown in FIG. 2(G), the power of the received light $P_{\lambda(Rx)}$ entering the C port 208 of the 2×2 single-mode optical couplers 202 is arbitrarily divided between the A port 204, and the B port 206. Each of the destination ports will propagate a complimentary portion the light at P1 and P2, as defined above.

As shown in FIG. 2(H), the power of the received light $P_{\lambda(Rx)}$ entering the D port 210 of the 2×2 single-mode optical couplers 202 is arbitrarily divided between the A port 204, and the B port 206. Each of the destination ports will propagate a complimentary portion the light at P1 and P2, as defined above.

Figure 3:
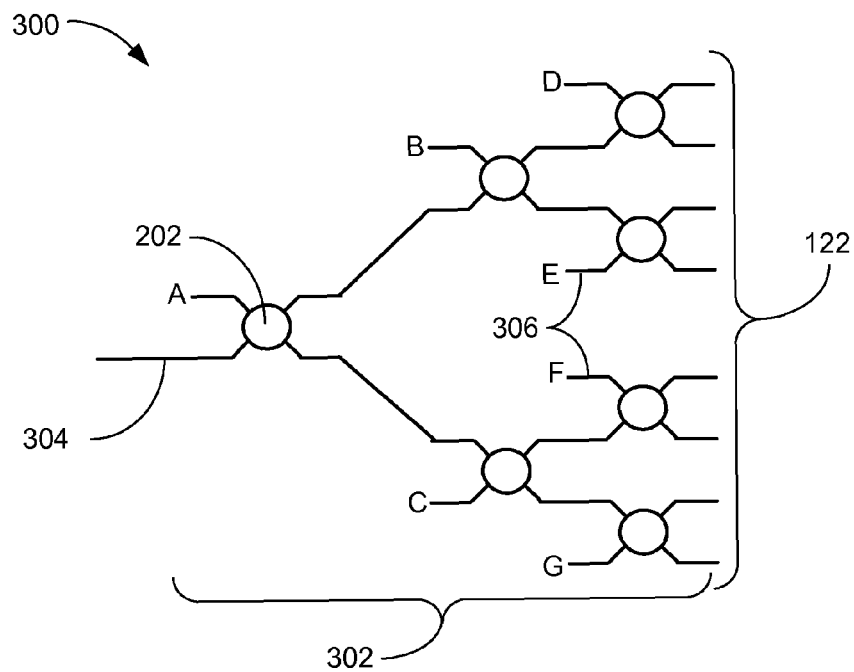
FIG. 3 is a functional block diagram of the 1×N single-mode optical splitter/combiner, of FIG. 1.

Referring now to FIG. 3, therein is shown a functional block diagram of the 1×N single-mode optical splitter/combiner 102, of FIG. 1. The functional block diagram of the 1×N single-mode optical splitter/combiner 102 depicts an array 302 of the 2×2 single-mode optical couplers 202. A primary input is an OLT-facing port 304, which may be coupled to an OLT transmitter (not shown).

In the prior art, an ideal 1×N single mode optical splitter might be made of Y-junctions and is perfectly efficient in the downstream direction. However in the upstream direction, at each Y-junction, only one-half of the power from each leg will couple into the single upstream waveguide (not shown), while the excess power will radiate out of the waveguide as waste-light.

In the present invention each of the Y-junctions is replaced by a broadband version of the 2×2 single-mode optical couplers 202. The total upstream power launched into the two downstream facing legs can be preserved in the two upstream legs without radiating any portion of the power out from the waveguides. Only one of the two OLT-facing legs is used to form the 1×N single-mode optical splitter/combiner 102, as shown in FIG. 3.

An ideal 1×N single-mode optical splitter/combiner 102 may be formed out of (N−1) of the 2×2 single-mode optical couplers 202. In the present example, with N=8, a 1×8 single-mode optical splitter/combiner 300 may be formed by coupling 7 of the 2×2 single-mode optical couplers 202. It is understood that the selection of the number 8 for the 1×N single-mode optical splitter/combiner 102 is an example only and is not used in a limiting manner. It is also understood that the present invention may be practiced by using any number of the 2×2 single-mode optical couplers 202.

The total power launched into any subset of the ONU-facing optical ports 122 is described as P and the power from the OLT-facing port 304 will be P/N and the sum of the optical power from harvesting ports 306 labeled A, B, C . . . G will total P (N−1)/N. Also note that the 1×N single-mode optical splitter/combiner 102 can be formed from (N−1) of the 2×2 single-mode optical couplers 202, each with one port uncommitted and available to become the harvesting ports 306. In the above example where N was chosen to be 8, it takes (N−1) or 7 of the 2×2 single-mode optical couplers 202 to implement a 1×8 single-mode splitter/combiner 300.

Figure 4:
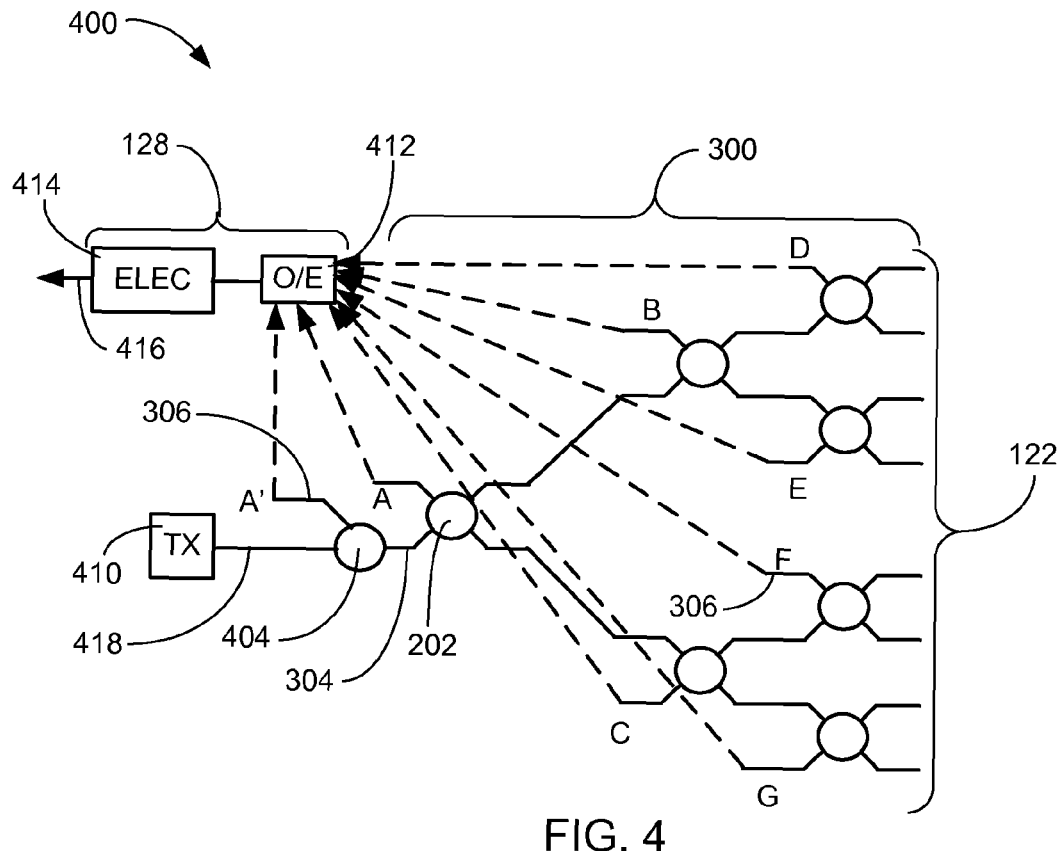
FIG. 4 is a functional block diagram of an optical line terminal transceiver.

Referring now to FIG. 4, therein is shown a functional block diagram of an optical line terminal transceiver 400 in an embodiment of the present invention. The functional block diagram of the optical line terminal transceiver 400 depicts the 1×N single-mode optical splitter/combiner 102, of FIG. 1, coupled to form the 1×8 single-mode splitter/combiner 300 of the previous example.

An array of the ONU-facing optical ports 122 may be coupled to optical network units (ONU) 124, of FIG. 1, that may be coupled by the single-mode optical fiber 126, of FIG. 1, and placed a great distance away from the optical line terminal transceiver 400. The array of the ONU-facing optical ports 122 is shown as not connected for simplicity of the description and it is understood that in an operational environment the single-mode optical fiber 126 and the optical network units 124, of FIG. 1, would be present.

The present invention utilizes the optical power from the harvesting ports 306 (A through G) of the 2×2 single-mode optical couplers 202, which make up the 1×N single-mode optical splitter/combiner 102 in a format usable for the optical communications system.

An ideal model of a wavelength division multiplexer 404, such as a three port wavelength division multiplexer, is attached to the OLT-facing port 304 of the 1×8 single-mode splitter/combiner 300. The harvesting port 306, of the wavelength division multiplexer 404, diverts the upstream wavelength ($\lambda$(Rx)) that is identified as A', while the path from an optical line terminal-facing port 418 to first coupler via the wavelength division multiplexer 404 is fully transmissive at the downstream wavelength ($\lambda$(Tx)) as sourced from an optical line terminal transmitter 410.

The full recovery of the upstream power, $P_{\lambda(Rx)}$, is made possible by coupling the harvesting ports 306, (A through G) from the 2×2 single-mode optical couplers 202 and (A') from the wavelength division multiplexer 404 to collect harvested-light from the harvesting ports 306, through an optical/electrical converter 412 to the optical line terminal receiver 128. The harvested-light collected from the harvesting ports 306 of the 2×2 single-mode optical couplers 202 would, in prior art systems, normally be allowed to dissipate within the splitter as waste-light without being used.

By collecting the harvested-light in the optical line terminal receiver 128, the present invention simplifies the receiving process and collects all of the power delivered to the 2×2 single-mode optical couplers 202. In this case, if the total power launched into any subset of the N ports is P, the power from the optical line terminal-facing port 418 will be zero and the sum of the optical power from the harvesting ports 306, labeled A, B, C . . . G and A', will total P.

It has been discovered that the present invention may simplify the design requirements of an optical line terminal receiver electronics 414 by providing the full amount of the $P_{\lambda(Rx)}$ that was initially launched. The simplification in the optical line terminal receiver electronics 414 may reduce cost of the optical line terminal receiver electronics 414 while increasing performance by decreasing the bit error ratio of the receiver data 416 that was launched data from the ONU 124, of FIG. 1.

In a passive optical network (PON) optical line terminal the optical line terminal (OLT) transmitter 410 generates a downstream optical signal at the wavelength $\lambda_{(Tx)}$. The optical signal from the PON OLT transmitter 410 is directed through the optical line terminal-facing port 418, such as an OLT-facing single-mode optical port. At the PON OLT there is the optical line terminal receiver 128 designed to receive optical signals from the ONUS at the wavelength $\lambda_{(Rx)}$.

The invention can be used to couple light from the harvesting ports 306, of FIG. 3, of the 2×2 single-mode optical couplers 202, which comprise the 1×N single-mode optical splitter/combiner 102, and the harvesting port 306 of the wavelength division multiplexer 404 to the optical line terminal receiver 128 such that the upstream optical signal from any one of the ONU-facing optical ports 122 is simultaneously directed to the optical line terminal receiver 128 by two or more distinct optical paths, in a format usable for the optical communications system.

To insure a format usable for the optical communications, the optical signals in at least two of the harvesting ports 306 (originating at the harvesting ports 306 of the 2×2 single-mode optical couplers 202 and the harvesting port 306 of the wavelength division multiplexer 404) are coupled into one or more single-mode or multi-mode optical waveguides or fibers (indicated by the dashed lines) and one or more of the optical/electrical converter 412, in which the active area of a photo-detector (not shown) is significantly larger than the mode field diameter of single-mode optical signal in the single-mode optical waveguide.

The format usable for the optical communications system requires that the time for the communications signal to propagate from any of the array of the ONU-facing optical ports 122 to a common electrical junction within the receiver through multiple optical paths are substantially equal within a tolerance of $\Delta t$, where $\Delta t \ll 1/B_e$ and $B_e$ is the electrical bandwidth of the communication signal modulating the optical carrier.

Figure 5:
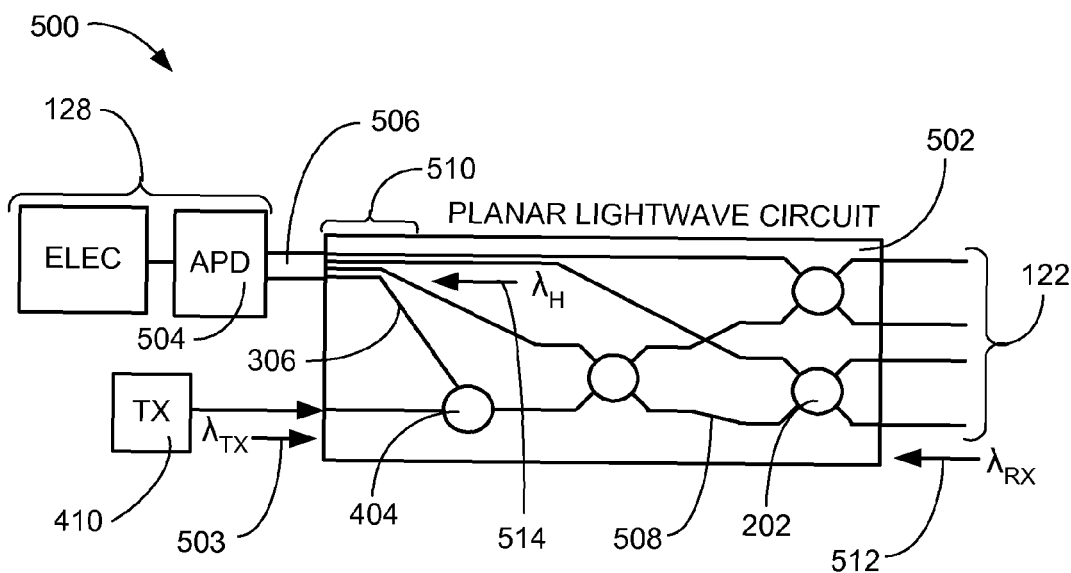
FIG. 5 is a schematic diagram of an optical line terminal transceiver in an embodiment of the present invention.

Referring now to FIG. 5, therein is shown a schematic diagram of an optical line terminal transceiver 500 in an embodiment of the present invention. The schematic diagram of the optical line terminal transceiver 500 depicts a planar lightwave circuit 502 having a 1×N single-mode optical splitter/combiner with the 2×2 single-mode optical couplers 202 arranged to provide a 1×4 single-mode optical splitter/combiner as an example of the present invention. It is understood that the 1×4 single-mode optical splitter/combiner is an example to aid in the discussion of the present invention and not intended to limit the range of the invention in any way.

The preferred embodiment, as an example, integrates this invention into the structure of the planar lightwave circuit 502. The four-port version integrated onto the planar lightwave circuit 502 utilizes the 2×2 single-mode optical couplers 202 that are designed to evenly split power from the optical line terminal transmitter 410 at a wavelength, $\lambda_{(Tx)}$.

In this case a first wavelength 503, such as 1480 nm$\leq \lambda_{(Tx)} \leq$1500 nm as is required for Gigabit Passive Optical Network (GPON) and Gigabit Ethernet Passive Optical Network (GE-PON) systems. The wavelength division multiplexer 404 preferentially directs some of the upstream signal at a second wavelength 512, such as 1260 nm$\leq \lambda_{Rx} \leq$1360 nm, to an avalanche photo diode 504, while minimally impacting the flow of the downstream signal through the wavelength division multiplexer 404.

The planar lightwave circuit 502 structure is designed such that any path from any one of the four ports in the array of the ONU-facing optical ports 122 to the active surface of the avalanche photo diode 504 are equal within a tolerance of 40 pico-seconds (ps), in order to provide the format usable for the optical communications system, as suitable to enable "on-off keying"—"non-return to zero" (OOK-NRZ) signals at 1.25 Gb/s as are used in the upstream of a GE-PON or GPON. The designer must take into account not only the path lengths of the waveguides on the planar lightwave circuit 502, but also the modal dispersion of a multi-mode optical waveguide 506, in determining the optimal design.

In the preferred embodiment of the planar lightwave circuit 502, single-mode optical waveguides 508, such as single-mode optical waveguides, have a numerical aperture (NA) of 0.22, a cross-section of 4.5-μm square, and the mode field diameter of approximately 3.7 μm at 1310 nm. Single-mode optical waveguides 508, such as patterned poly-silicon glass or optical fiber, may be routed to the exit of the planar lightwave circuit 502 in a array of single-mode optical waveguides 510 with 8 μm spacing. The harvested-light $(\lambda_H)$ 514 may be derived from the second wavelength 512 received through the array of the ONU-facing optical ports 122.

The multi-mode optical waveguide 506 has a 50-μm core diameter and a NA of 0.27. The single-mode optical waveguides 508 described can simultaneously be coupled to the multi-mode optical waveguide 506 with nearly unity efficiency. The opposite end of the multi-mode optical waveguide 506 may be pigtailed to the avalanche photo diode 504 with a 65-μm active area at an efficiency approaching unity.

The design of the single-mode optical waveguides 508 and choice of the multi-mode optical waveguide 506, including the length of the multi-mode optical waveguide 506, must insure that the signal from any one of the array of the ONU-facing optical ports 122, propagating along distinct optical paths, must arrive at the avalanche photo diode 504 within a tolerance of 40 ps with any other copies of the signal originating from the identical one of the ONU-facing optical ports 122, but propagating along a distinct optical path. The total delay from a specific one of the ONU-facing optical ports 122 through any of the single-mode optical waveguides 508, to the avalanche photo diode 504 also includes modal dispersion in the multi-mode optical waveguide 506.

The schematic diagram of FIG. 5 and other diagrams in this specification are an example only and are not intended to convey design criteria of the single-mode optical waveguides 508 but only to show linkages without providing additional limitations. The actual layout of the single-mode optical waveguides 508 must conform to the multi-path length restrictions dictated by the application in order to meet the criteria of the present invention.

The planar lightwave circuit 502 is an integrated device, which can be used to split the downstream optical signal from the optical line terminal transmitter 410, in an implementation of a GE-PON or GPON OLT, into the array of the ONU-facing optical ports 122, while simultaneously combining the upstream optical power from the array of the ONU-facing optical ports 122 and guiding the upstream signal to the avalanche photo diode 504 in a form useful for upstream communications at the bit rate conforming to the GE-PON and GPON standards.

Figure 6:
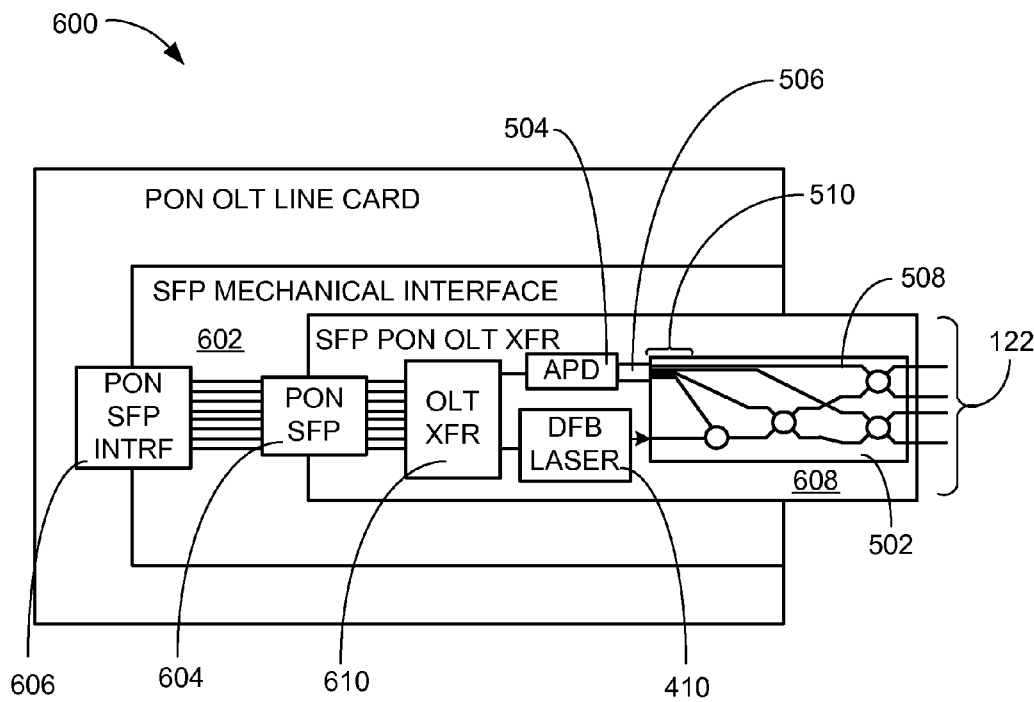
FIG. 6 is a functional block diagram of a passive optical network optical line terminal line card utilizing the planar lightwave circuit in an embodiment of the present invention.

Referring now to FIG. 6, therein is shown a functional block diagram of a passive optical network optical line terminal line card 600 utilizing the planar lightwave circuit 502 in an embodiment of the present invention. The functional block diagram of the passive optical network optical line terminal line card 600 depicts a small form-factor pluggable mechanical interface 602 having an electrical interface 606, such as a small form-factor pluggable industry standard interface for passive optical network support. The electrical interface 606 has an industry accepted specification for mechanical and electrical tolerances.

A small form-factor pluggable module 608 may couple to the mechanical interface 602, and to the electrical interface 606, through its electrical interface 604. In an embodiment of the present invention, as an example, the small form-factor pluggable module 608 may include an optical line terminal electrical circuit 610 that manages the transmission and receiving of the data between the small form-factor pluggable module 608 and the optical network units 124, of FIG. 1, that are distributed along the optical network (not shown). The optical line terminal electrical circuit 610 may provide an electrical interface that drives the optical line terminal transmitter 410, such as a distributed feedback (DFB) laser, and receives an electrical signal from the avalanche photo diode 504.

The optical line terminal electrical circuit 610 may condition the data to transfer it into the small form-factor pluggable module 608 in a Time Division Multiplexing (TDM) data format rather than the Time Division Multiple Access (TDMA) format that is exchanged through the array of the ONU-facing optical ports 122. The presence of the multi-mode optical waveguide 506 connection from the planar lightwave circuit 502 to the avalanche photo diode 504 allows the inclusion of the harvesting ports 306 of the 2×2 single-mode optical couplers 202 where only one of the optical line terminal-facing port 304 is supported by the prior art.

By providing the planar lightwave circuit 502 on the small form-factor pluggable module 608, the number of the ONU-facing optical ports 122 is increased from one to four without increasing the space or hardware required by the prior art solutions. It is understood that the planar lightwave circuit 502 is shown having four of the array of the ONU-facing optical ports 122 by way of an example and other numbers of the ONU-facing optical ports 122 is possible.

It will be understood by those skilled in the art that the invention can be extended to other types of point-to-multi-point optical communications networks, including but not limited those defined by the 10 G-EPON standard, the emerging ITU-T 10 G-PON standard, RF over glass (RFoG) networks, other hybrid-fiber coax networks, and other point-to-multi-point optical (or partially optical) networks.

While the above example includes the multi-mode optical waveguide 506 connection through the avalanche photo diode 504, other implementations are possible that do not include the multi-mode optical waveguide 506. As an example, each of the single-mode optical waveguides 508 from the planar lightwave circuit 502 may be coupled to individual single-mode receivers (not shown) for conversion to the electrical interface of the optical line terminal electrical circuit 610.

The planar lightwave circuit 502 of the present invention may have application as a broadband downstream splitter, which is universal in optical broadcast communication networks. Alternate wavelengths can be incorporated into the invention for altering the intended application. The present invention may enable an implementation that is a broadband single-mode splitter in downstream direction, and a wavelength-independent optical power combiner in the upstream direction. The resulting device is applicable to various known passive optical network (PON) and hybrid-fiber coax networks (HFC) implementations, without regard for wavelength choice, and is only limited by bandwidth requirements on the upstream signal, and the tolerance on the multipath combining optics, electro-optics, and electronics.

It is understood that the planar lightwave circuit 502 may include active optical elements (not shown) such as the optical line terminal transmitter 410 or receivers with optical booster or pre-amplifiers, the avalanche photo diode 504, optical intensity amplifiers, polarization or phase modulators, optical amplifiers including semiconductor optical amplifiers, or variable optical attenuators. Other implementations can include a photo-receiver whose active area has a shape more compatible with the linear output of a multi-mode slab waveguide or the array of single-mode optical waveguides 510 of the single-mode optical waveguides 508.

The planar lightwave circuit 502 can also include integrated passive optical elements such thin-film filters, Mach-Zehnder-based inteferometric filters, arrayed waveguide gratings, Bragg gratings, or multi-mode interference filters. One critical use for passive filters is to keep any stray light from the optical line terminal transmitter 410 or other sources from interfering with the received signal at the avalanche photo diode 504.

Figure 7:
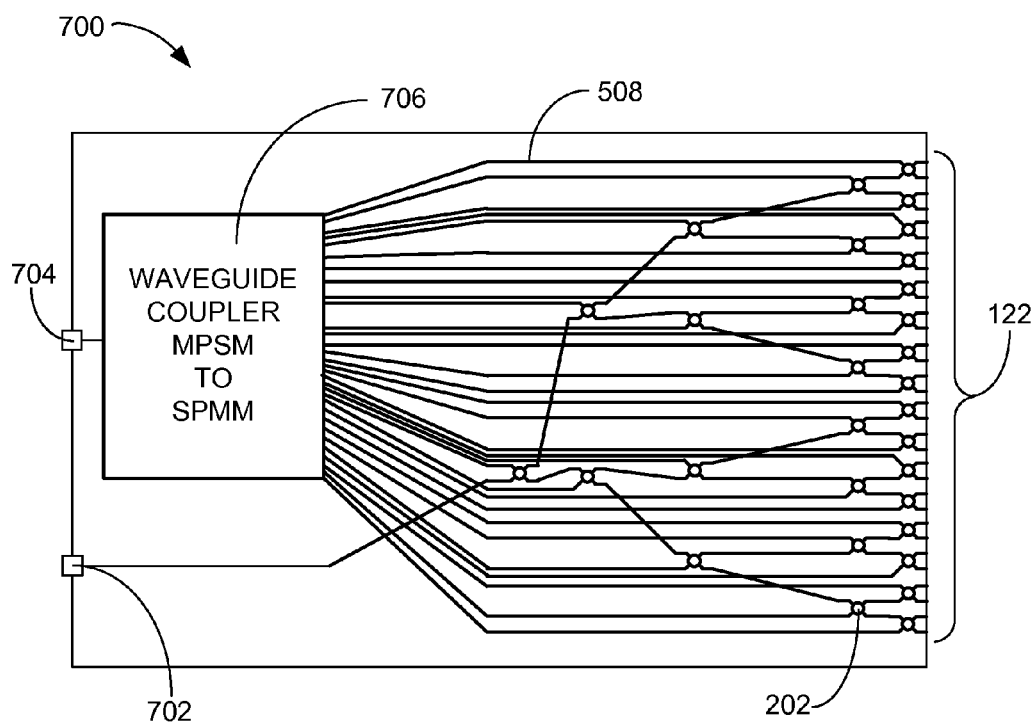
FIG. 7 is a schematic diagram of a 1×32 single-mode optical splitter/combiner in an embodiment of the present invention.

Referring now to FIG. 7, therein is shown a schematic diagram of a 1×32 single-mode optical splitter/combiner 700 in an embodiment of the present invention. The schematic diagram of the 1×32 single-mode optical splitter/combiner 700 depicts 31 of the 2×2 single-mode optical couplers 202 coupled in a pyramid fashion.

While the preferred embodiment of the 1×32 single-mode optical splitter/combiner 700 is shown to include the 2×2 single-mode optical couplers 202, various constructions may be accommodated and built as the planar lightwave circuit 502, of FIG. 5, including but not limited to arrayed waveguide gratings (AWGs), multi-mode interferometers (MMIs) and single-mode star couplers.

In general, any single-mode N×N star coupler structure, including (but not limited to) Dragone routers, MMIs, arrays of the 2×2 single-mode optical couplers 202, and fused-fiber based star couplers can function as both a 1×N splitter, and as a collector for the harvested-light. If the waveguide design can accommodate the restrictions on the path length tolerances required by the upstream bandwidth, any N×N star coupler structure can form the basis or a part of an implementation.

In implementing the planar lightwave circuit 502, care must be taken to limit the number of crossings of the single-mode optical waveguides 508 because each of the crossings of the single-mode optical waveguides 508 increases an optical loss penalty, and decreases manufacturability.

The embodiment of the 1×32 single-mode optical splitter/combiner 700 has a total of 24 waveguide crossings, and the worst case path from any of the ONU-facing optical ports 122 to the upstream photo-detector includes at most two waveguide crossings. This represents a significant improvement over the prior art, which may provide reduced size and improved manufacturing margins.

Integration of a 1×32 single-mode optical splitter with a multi-path optical power combiner there are a total of 36 waveguide crossings compared to 496 for the prior art, and the worst case path crossing is 26 on the splitter, and the worst case on the combiner crossing is two, compared to the prior art which requires 31 optical crossings for the splitter and 31 optical crossings for the combiner. The significant reduction in the number of optical crossings simplifies the design of the planar lightwave circuit 502 and increases the manufacturing margin.

An additional benefit is the lowering or elimination of wavelength dependence. In the PON application, both upstream and downstream wavelengths are defined over a specified range and the planar lightwave circuit 502 can accommodate the entire range with no additional changes.

By way of an example, GPONs require that the optical line terminal transmitter 410 (downstream) emits light at a wavelength between 1480 and 1500 nm. All ONU transmitters (upstream) must emit light at a wavelength between 1260 and 1360 nm. It will be understood by one having ordinary skill in the art that the 2×2 single-mode optical couplers 202 and the single-mode optical waveguides 508 are capable of supporting both ranges concurrently.

It is understood that as N increases; the value of including a wavelength division multiplexer coupler 404 to harvest the upstream light from the OLT-facing port 304 diminishes. In addition, the requirement that the 2×2 single-mode optical couplers 202 operate over a broad band is relaxed. There is no requirement on the optical power split ratio in the upstream, only the downstream splitting requirement (i.e. 50% to each port of the 2×2 single-mode optical couplers 202) needs specification. It is known by those having ordinary skill in the art that more care and space is required in creating a planar lightwave circuit-based 2×2 single-mode optical couplers 202 that operates over a broad band than one that operates over a narrow band.

In addition, the fabrication of planar lightwave circuit-based WDM filters becomes more difficult and requires more sub-stages, which translates into more total planar lightwave circuit length, as wavelength specifications are tightened. The prior art requires N three-port WDM couplers. In comparison the present invention requires zero or one of the three-port WDM couplers simplifying both design and manufacturability, while also reducing device size.

The elimination of the WDM couplers from the 1×32 single-mode optical splitter/combiner 700 makes the device much more wavelength agnostic. One having ordinary skill in the art can now design a single device to operate under a wide range of wavelength requirements. This one-size-fits-all approach can lead to lower manufacturing complexity, and shorter time-to-market for a new product.

Figure 8:
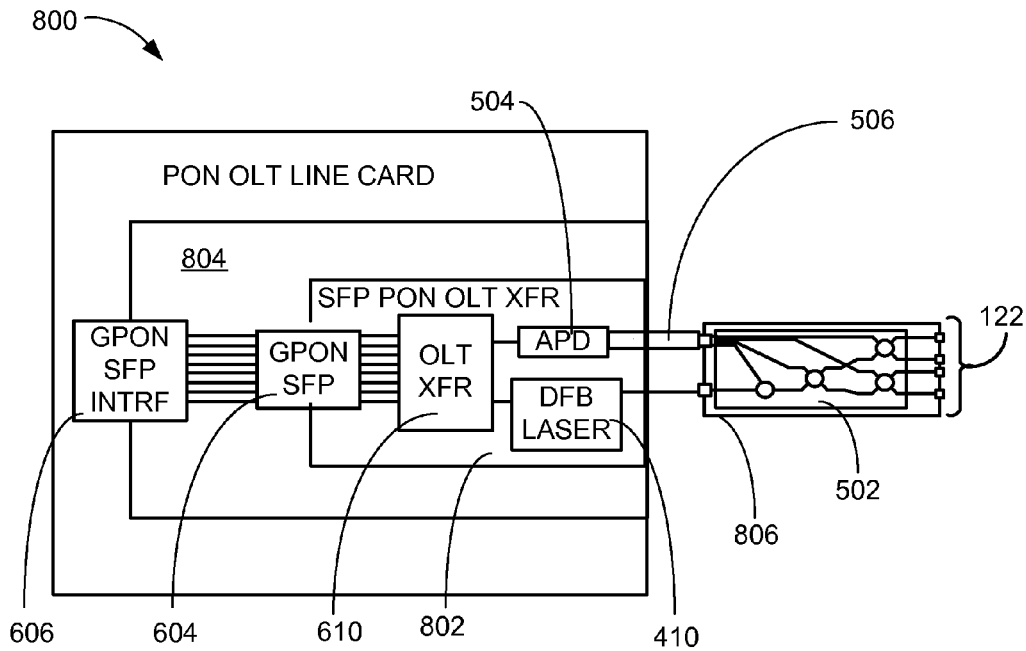
FIG. 8 is a functional block diagram of a passive optical network line card utilizing an external version of the planar lightwave circuit in a second embodiment of the present invention.

Referring now to FIG. 8, therein is shown is a functional block diagram of a passive optical network optical line terminal line card 800 utilizing an external version of the planar lightwave circuit 502 in a second embodiment of the present invention. The functional block diagram of the passive optical network optical line terminal line card 800 depicts a small form-factor pluggable module 802 having the primary interface 604, such as a small form-factor pluggable industry standard interface for passive optical network support. The primary interface 604 has an industry accepted specification for mechanical and electrical tolerances.

A Passive Optical Network mechanical interface 804 can have the electrical interface 606. In the prior art structure of a pluggable optical module (not shown) that is substantially similar to the small form-factor pluggable module 802, only one of the ONU-facing optical ports 122 was provided. This prior art limitation causes additional hardware, space, and power to be consumed in order to increase the number of the ONU-facing optical ports 122 supported by the passive optical network line card 800.

In the second embodiment of the present invention, the small form-factor pluggable module 802 may include the optical line terminal electrical circuit 610 that manages the transmission and receiving of the data between the small form-factor pluggable module 802 and the optical network units 124, of FIG. 1, that are distributed along the optical network (not shown). The optical line terminal electrical circuit 610 can provide an electrical interface that drives the optical line terminal transmitter 410, such as a distributed feedback (DFB) laser, and receives an electrical signal from the avalanche photo diode 504. The small form-factor pluggable module 802 may be shorter than the small form-factor pluggable module 608, of FIG. 6, because the planar lightwave circuit 502 is moved to a remote interface board 806, such as a completely passive optical interface board.

It is understood that the optical and electrical contents of the small form-factor pluggable module 802 may be assembled in other form factors and the use of the small form-factor pluggable module 802 as an example is provided because of the challenging nature of the small size. It is further understood that the remote interface board 806 is a completely passive optical element that may be used to extend or expand an existing optical network.

By providing the planar lightwave circuit 502 on the remote interface board 806, the number of the ONU-facing optical ports 122 is increased from one to four without increasing the space or hardware required by the prior art solutions. It is understood that the planar lightwave circuit 502 is shown having four of the ONU-facing optical ports 122 by way of an example and other numbers of the ONU-facing optical ports 122 is possible. It is also understood that the remote interface board 806 may provide interconnect hardware for coupling the multi-mode optical waveguide 506 and the single-mode fibers from the optical network units 124, of FIG. 1.

It is further understood that the present invention places no limitations on the physical location of its constituent parts, so long as the design rules are preserved. Accordingly, certain embodiments may advantageously physically separate constituent parts and/or locate them in distinct modules. In the examples illustrated below, the passive optical functions are isolated to the remote interface board 806.

Figure 9:
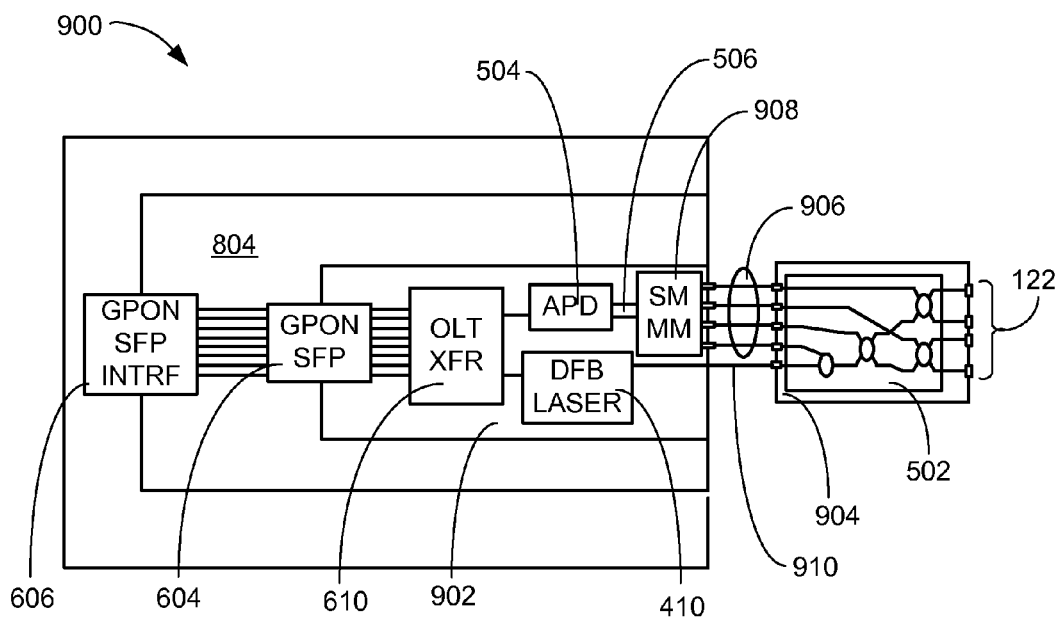
FIG. 9 is a functional block diagram of a passive optical network optical line terminal line card utilizing an external version of the planar lightwave circuit in a third embodiment of the present invention.

Referring now to FIG. 9, therein is shown a functional block diagram of a passive optical network optical line terminal line card 900 utilizing the external version of the planar lightwave circuit 502 in a third embodiment of the present invention. The functional block diagram of the passive optical network optical line terminal line card 900 depicts the small form-factor pluggable module 902 having the primary interface 604, such as a small form-factor pluggable industry standard interface for passive optical network support. The primary interface 604 has an industry accepted specification for mechanical and electrical tolerances.

The Passive Optical Network mechanical interface 804 may have the electrical interface 606.

In the third embodiment of the present invention, the small form-factor pluggable module 902 may include the optical line terminal electrical circuit 610 that manages the transmission and receiving of the data between the small form-factor pluggable module 902 and the optical network units 124, of FIG. 1, that are distributed along the optical network (not shown). The optical line terminal electrical circuit 610 may provide an electrical interface that drives the optical line terminal transmitter 410, such as a distributed feedback (DFB) laser, and receives an electrical signal from the avalanche photo diode 504.

The small form-factor pluggable module 902 may be smaller than the small form-factor pluggable module 608, of FIG. 6, because the planar lightwave circuit 502 is moved to the remote interface board 904, such as a completely passive optical interface board. A single-mode interface bus 906 may comprise a bundle of single mode fibers coupled between the remote interface board 904 and the small form-factor pluggable module 902. A single-mode to multi-mode combiner 908 is a multiple input single-mode converter to a single output of the multi-mode optical waveguide 506. The single-mode to multi-mode combiner 908 may include a lens structure, a proximity structure or the like.

By providing the planar lightwave circuit 502 on the remote interface board 904, the number of the ONU-facing optical ports 122 is increased from one to four without increasing the space or hardware. It is understood that the planar lightwave circuit 502 is shown having four of the ONU-facing optical ports 122 by way of an example and other numbers of the ONU-facing optical ports 122 is possible. It is also understood that the remote interface board 806 may provide interconnect hardware for coupling the single-mode interface bus 906 and the single-mode fibers from the optical network units 124, of FIG. 1. A single-mode optical fiber 910 may be coupled between the optical line terminal transmitter 410 and the remote interface board 904.

Figure 10:
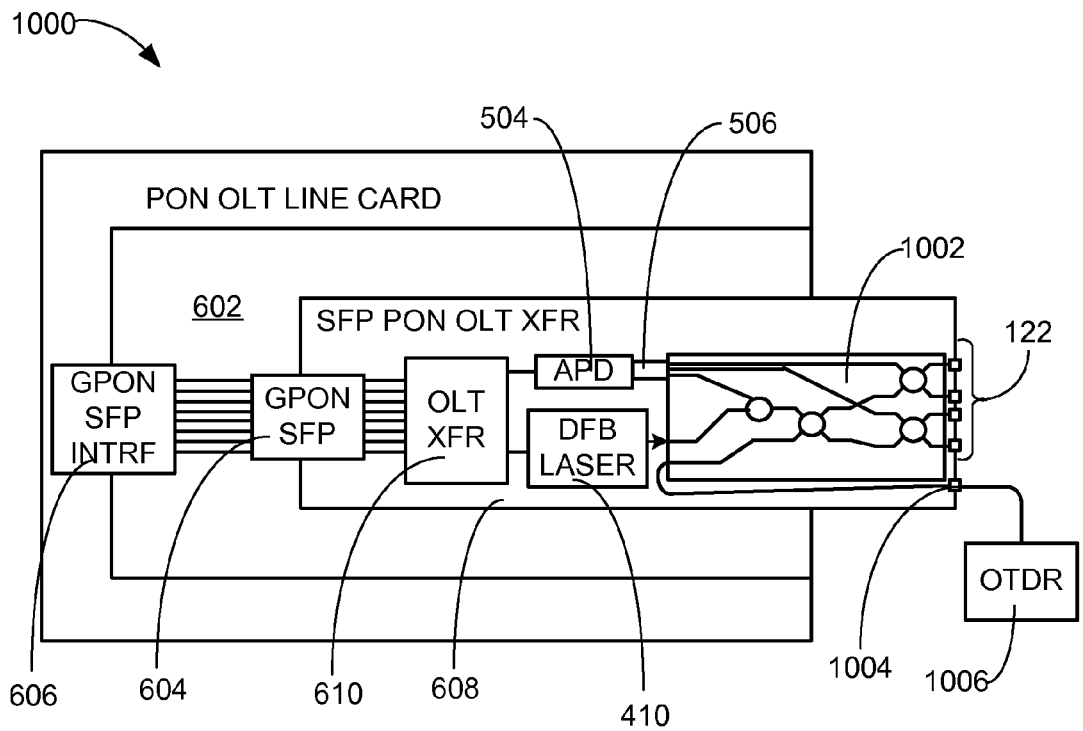
FIG. 10 is a functional block diagram of a passive optical network optical line terminal line card utilizing the planar lightwave circuit in a fourth embodiment of the present invention.

Referring now to FIG. 10, therein is shown a functional block diagram of a passive optical network optical line terminal line card 1000 utilizing the planar lightwave circuit in a fourth embodiment of the present invention. The functional block diagram of the passive optical network optical line terminal line card 1000 depicts the small form-factor pluggable module 608 having the primary interface 604, such as a small form-factor pluggable industry standard interface for passive optical network support. The primary interface 604 has an industry accepted specification for mechanical and electrical tolerances.

The small form-factor pluggable mechanical interface 602 may have the electrical interface 606. The electrical interface 606 is intended to allow replacement of the small form-factor pluggable module 608.

In a fourth embodiment of the present invention, the small form-factor pluggable module 608 may include the optical line terminal electrical circuit 610 that manages the transmission and receiving of the data between the small form-factor pluggable module 608 and the optical network units 124, of FIG. 1, that are distributed along the optical network (not shown). The optical line terminal electrical circuit 610 may provide the electrical interface that drives the optical line terminal transmitter 410, such as a distributed feedback (DFB) laser, and receives the electrical signal from the avalanche photo diode 504.

By providing a planar lightwave circuit 1002 on the small form-factor pluggable module 608, the number of the ONU-facing optical ports 122 is increased from one to four without increasing the space or hardware required by the prior art solutions. It is understood that the planar lightwave circuit 1002 is shown having four of the ONU-facing optical ports 122 by way of an example and other numbers of the ONU-facing optical ports 122 is possible.

The planar lightwave circuit 1002 may provide a utility port 1004 for attachment of an optical time domain reflectometer 1006. The optical time domain reflectometer 1006 may transmit and receive network monitoring signals without adding any additional signal degradation penalties. In the prior art configuration, application of an optical time domain reflectometry probe wavelength was accomplished by the addition of a WDM filter, adding a non-negligible insertion loss to the overall PON link budget. Use of a low-bend loss optical fiber between the planar lightwave circuit 1002 and the utility port 1004 facilitates the circuitous optical path with minimum insertion loss. In this example the optical time domain reflectometer 1006 is shown as an external device which may be inserted for diagnostic purposes.

The utility port 1004 may also be advantageously used for injection of an overlay wavelength for broadcast (one-way) services, such as the 1550-1560 nm video enhancement band defined in both IEEE and ITU-T standards. The injection of the overlay wavelength through the utility port 1004 does not impose any additional signal loss due to the connection of the utility port 1004.

The utility port 1004 may also be used as an input port for a next generation overlay for two-way passive optical networks on the existing passive optical network infrastructure. In many cases a blocking filter may be inserted before the photo-detector or detectors to eliminate interference from the new PON upstream signals onto the old PON upstream signals. An example of this would be the overlay line of the "next-generation" G.987 10 G-rate PON on an existing G.984 GPON. In the prior art, and as defined in draft versions of G.987.2, such an overlay would contribute a 1 dB additional loss to the PON link budget due to the insertion loss of the WDM filter. Notably, in the implementation of the present invention this 1 dB loss is eliminated.

In the example above, one of the ports from the most common of the 2×2 single-mode optical couplers 202 is presented to the edge of the module for reuse. In an identical fashion, a broadcast video network or a next-generation PON can be applied to the existing PON by utilizing the same port.

Figure 11:
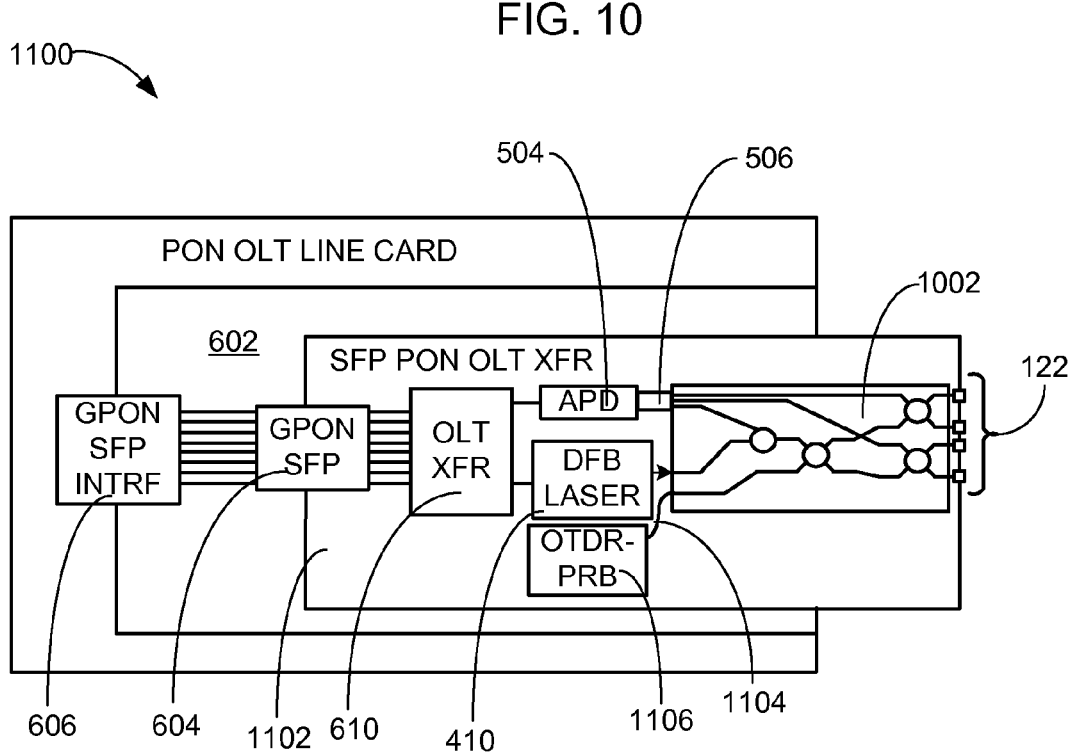
FIG. 11 is a functional block diagram of a passive optical network optical line terminal line card utilizing the planar lightwave circuit in a fifth embodiment of the present invention.

Referring now to FIG. 11, therein is shown a functional block diagram of a passive optical network optical line terminal line card 1100 utilizing the planar lightwave circuit 1002 in a fifth embodiment of the present invention. The functional block diagram of the passive optical network optical line terminal line card 1100 depicts a small form-factor pluggable module 1102 having the primary interface 604, such as a small form-factor pluggable industry standard interface for passive optical network support. The primary interface 604 has an industry accepted specification for mechanical and electrical tolerances.

In the fifth embodiment of the present invention, the small form-factor pluggable module 1102 may include the optical line terminal electrical circuit 610 that manages the transmission and receiving of the data between the small form-factor pluggable module 1102 and the optical network units 124, of FIG. 1, that are distributed along the optical network (not shown). The optical line terminal electrical circuit 610 may provide the electrical interface that drives the optical line terminal transmitter 410, such as a distributed feedback laser, and receives the electrical signal from the avalanche photo diode 504.

The presence of the multi-mode optical waveguide 506 connection through the avalanche photo diode 504 allows the inclusion of four of the ONU-facing optical ports 122 where only one of the ONU-facing optical ports 122 is supported by the prior art.

By providing the planar lightwave circuit 1002 on the small form-factor pluggable module 608, the number of the ONU-facing optical ports 122 is increased from one to four without increasing the space or hardware required by the prior art solutions. It is understood that the planar lightwave circuit 1002 is shown having four of the ONU-facing optical ports 122 by way of an example and other numbers of the ONU-facing optical ports 122 is possible.

The planar lightwave circuit 1002 may provide a utility link 1104 for attachment of an optical time domain reflectometer probe 1106, such as a passive receiver probe or a bi-directional transceiver probe, located within the small form-factor pluggable module 1102. The optical time domain reflectometer probe 1106 may receive network monitoring signals without adding any additional signal degradation penalties to the SFP PON OLT transceiver.

Figure 12:
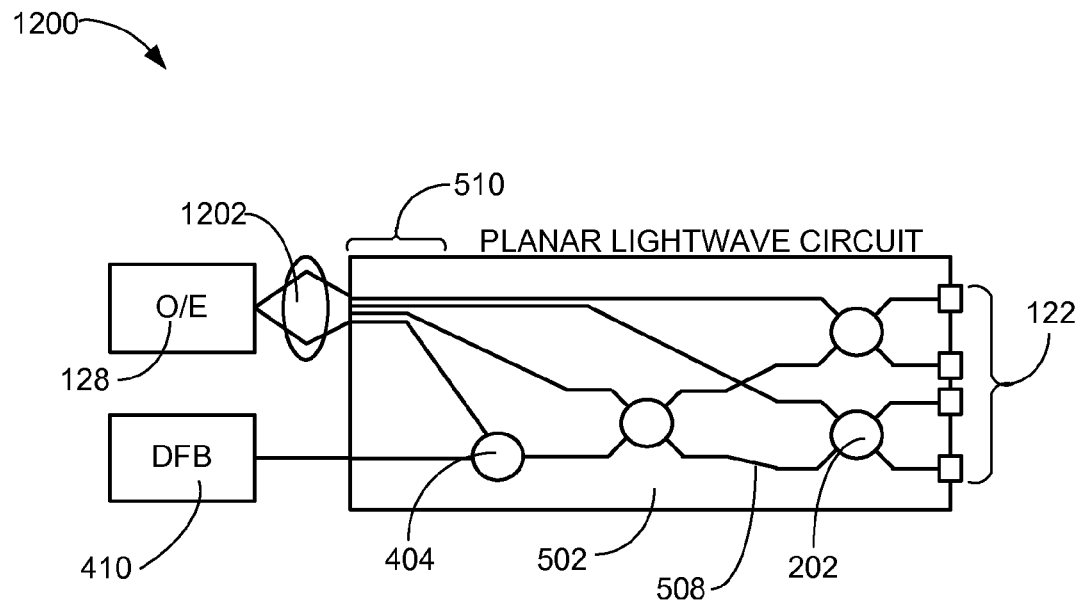
FIG. 12 is a schematic diagram of an optical line terminal transceiver utilizing a 1×4 single-mode optical splitter/combiner in an embodiment of the present invention.

Referring now to FIG. 12, therein is shown a schematic diagram of an optical line terminal transceiver 1200 utilizing a 1×4 single-mode optical splitter/combiner in an embodiment of the present invention. The schematic diagram of the optical line terminal transceiver 1200 depicts the planar lightwave circuit 502 having the 2×2 single-mode optical couplers 202 arranged to provide the 1×4 single-mode optical splitter/combiner in an example of the present invention.

The preferred embodiment, as an example, integrates this invention into the structure of the planar lightwave circuit 502. The four-port version integrated onto the planar lightwave circuit 502 utilizes the 2×2 single-mode optical couplers 202 that are designed to evenly split power from the optical line terminal transmitter 410 at the wavelength, $\lambda_{(Tx)}$. In this case, 1480 nm $\leq \lambda_{(Tx)} \leq$ 1500 nm as is required for Gigabit Passive Optical Network (GPON) and Gigabit Ethernet Passive Optical Network (GE-PON) systems. The wavelength division multiplexer 404 preferentially directs some of the upstream signal at 1260 nm≤$\lambda_{Rx}$≤1360 nm to the optical line terminal receiver 128, which may contain a combination of optical and electrical devices (not shown), without impacting the flow of the downstream signal through the wavelength division multiplexer 404.

The planar lightwave circuit 502 structure is designed such that any path from any one of the four ports in the array of the ONU-facing optical ports 122 to the optical line terminal receiver 128 are equal within a tolerance of 40 ps, which is derived from the example above, as suitable to enable "on-off keying"—"non-return to zero" (OOK-NRZ) signals at 1.25 Gb/s as are used in the upstream direction of a GE-PON or GPON. The implementation must take into account not only the path lengths of the waveguides on the planar lightwave circuit 502, but also the modal dispersion of an optical coupler 1202, such as a lens, a refractive coupler, a reflective coupler, or a proximity device, in determining the optimal design.

In the preferred embodiment of the planar lightwave circuit 502, the single-mode optical waveguides 508 have the numerical aperture (NA) of 0.22, a cross-section of 4.5-µm square, and the mode field diameter of approximately 3.7 µm at 1310 nm. The single-mode optical waveguides 508 are routed to the exit of the planar lightwave circuit 502 in the array of single-mode optical waveguides 510 with 8 µm spacing. The optical coupler 1202, such as a lens, a refractive coupler, a reflective coupler, a proximity device, or the like. Those having ordinary skill in the art will realize that all four of the single-mode optical waveguides 508 described can simultaneously be coupled to the optical line terminal receiver 128 with a 65-µm active area at an efficiency approaching unity.

The design of the single-mode optical waveguides 508 and choice of the optical coupler 1202, must insure that the signal from any one of the ONU-facing optical ports 122, must arrive at the optical line terminal receiver 128, through two or more distinctive optical paths, within a tolerance of 40 ps with any other of the ONU-facing optical ports 122. The delay through any of the single-mode optical waveguides 508 must also consider any modal dispersion in the optical coupler 1202 due to the wavelength of the incoming signal.

The planar lightwave circuit 502 is an integrated device, which can be used to split the downstream optical signal from the optical line terminal transmitter 410, in an implementation of a GE-PON or GPON OLT, into the ONU-facing optical port 122, while simultaneously combining the optical power from the ONU-facing optical port 122 and guiding the upstream signal to the optical line terminal receiver 128 in a form useful for upstream communications at the bit rate conforming to the passive optical network standards.

Figure 13:
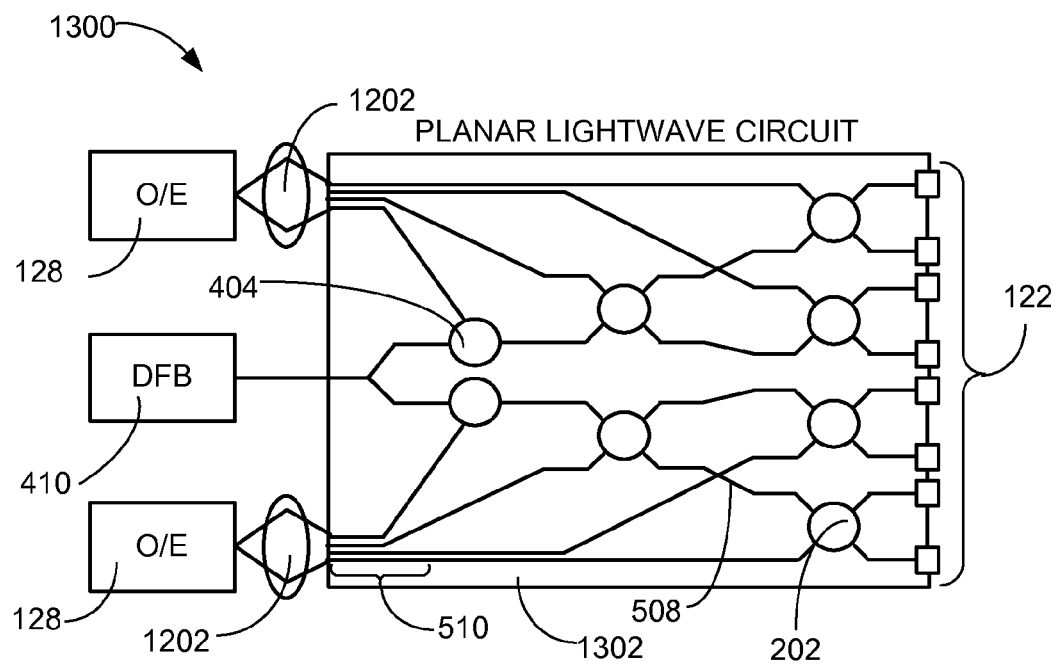
FIG. 13 is a schematic diagram of an optical line terminal transceiver utilizing a 1×8 single-mode optical splitter/combiner in a sixth embodiment of the present invention.

Referring now to FIG. 13, therein is shown a schematic diagram of an optical line terminal transceiver 1300 utilizing a 1×8 single-mode optical splitter/combiner in a sixth embodiment of the present invention. The schematic diagram of the optical line terminal transceiver 1300 depicts a planar lightwave circuit 1302 having the 2×2 single-mode optical couplers 202 arranged to provide the 1×8 single-mode optical splitter/combiner having a split receiver path as an example of the present invention.

The sixth embodiment integrates this invention into the structure of the planar lightwave circuit 1302. The eight-port version integrated onto the planar lightwave circuit 1302 utilizes the 2×2 single-mode optical couplers 202 that are designed to evenly split power from the optical line terminal transmitter 410 at the wavelength, $\lambda_{(Tx)}$. In this example, 1480 nm≤$\lambda_{(Tx)}$≤1500 nm as is required for Gigabit Passive Optical Network (GPON) and Gigabit Ethernet Passive Optical Network (GE-PON) systems. The wavelength division multiplexer 404 preferentially directs some of the upstream signal at 1260 nm≤$\lambda_{Rx}$≤1360 nm to the avalanche photo diode 504, without impacting the flow of the downstream signal through the wavelength division multiplexer 404.

The planar lightwave circuit 1302 structure is designed such that any path from any one of the first four ports in the array of the ONU-facing optical ports 122 to the optical line terminal receiver 128, travelling through the optical coupler, are equal within a tolerance of 40 ps, which is derived from the timing requirements of the data stream, as suitable to enable "on-off keying"—"non-return to zero" (OOK-NRZ) signals at 1.25 Gb/s as are used in the upstream direction of a GE-PON or GPON.

The implementation must take into account not only the path lengths of the waveguides on the planar lightwave circuit 1302, but also the modal dispersion of the first multi-mode optical waveguide 1304 and the second multi-mode optical waveguide 1308, in determining the optimal design. In this multiple receiver environment the delay path for any of the bits from the array of the ONU-facing optical ports 122 should meet the 40 ps design tolerance.

In the sixth embodiment of the invention, the planar lightwave circuit 1302 may have the single-mode optical waveguides 508 with the numerical aperture (NA) of 0.22, a cross-section of 4.5-µm square, and the mode field diameter of approximately 3.7 µm at 1310 nm. The single-mode optical waveguides 508 exit the planar lightwave circuit 1302 in two linear arrays with 8 µm spacing. The optical coupler 1202 may include a lens, reflective coupling, refractive coupling, proximity coupling, or the like. Those having ordinary skill in the art will realize that all four of the single-mode optical waveguides 508 in the array of single-mode optical waveguides 510 described can simultaneously be coupled to the optical line terminal receiver 128 with nearly unity efficiency.

The design of the single-mode optical waveguides 508 in the array of single-mode optical waveguides 510 and choice of the optical coupler 1202 must insure that the signal from any one of the ONU-facing ports 122, must arrive at the optical line terminal receiver 128 within a tolerance of 40 ps with any other of the ONU-facing optical ports 122. The delay through any of the single-mode optical waveguides 508 in the array of single-mode optical waveguides 510 must also consider any modal dispersion in the optical coupler 1202. The optical coupler 1202, between the array of single-mode optical waveguides 510 and the optical line terminal receiver 128, may include a lens, reflective coupling, refractive coupling, proximity coupling, or the like.

It is understood that while the optical line terminal receiver 128 is shown in two segments being coupled to independent instances of the optical coupler 1202, there may be a convergence of the electronic portion of the optical line terminal receiver 128 that is not shown. In an alternative construction the optical line terminal receiver 128 may have two ports that couple to each of the instances of the optical coupler 1202.

The planar lightwave circuit 1302 is an integrated device, which can be used to split the downstream optical signal from the optical line terminal transmitter 410, in an implementation of a GE-PON or GPON OLT, into the ONU-facing optical ports 122, while simultaneously combining the optical power from the ONU-facing optical ports 122 and guiding the upstream signal to the optical line terminal receiver 128 or the second avalanche photo diode 1306 in a form useful for upstream communications at the bit rate conforming to the passive optical network standards.

The above described configuration may allow the use of existing integrated electronics to perform operations on the upstream signal. Such a configuration might enable a faster manufacturing response time to a new product requirement. The additional flexibility provided by the present invention enhances the manufacturability and design margin for products that implement it. For example, the number of ONU-facing optical ports 122 that can be coupled into a single photo-detector is a function is inversely related to the size of the photo-detector. In general, higher-speed (or bandwidth) photo-detectors have smaller active detection areas. In the event that the number of desired downstream ports exceeds the number that can be effectively coupled into a single photo-receiver one may desire to use another photo-receiver in order to maintain manufacturing margin and delivery schedule.

Figure 14:
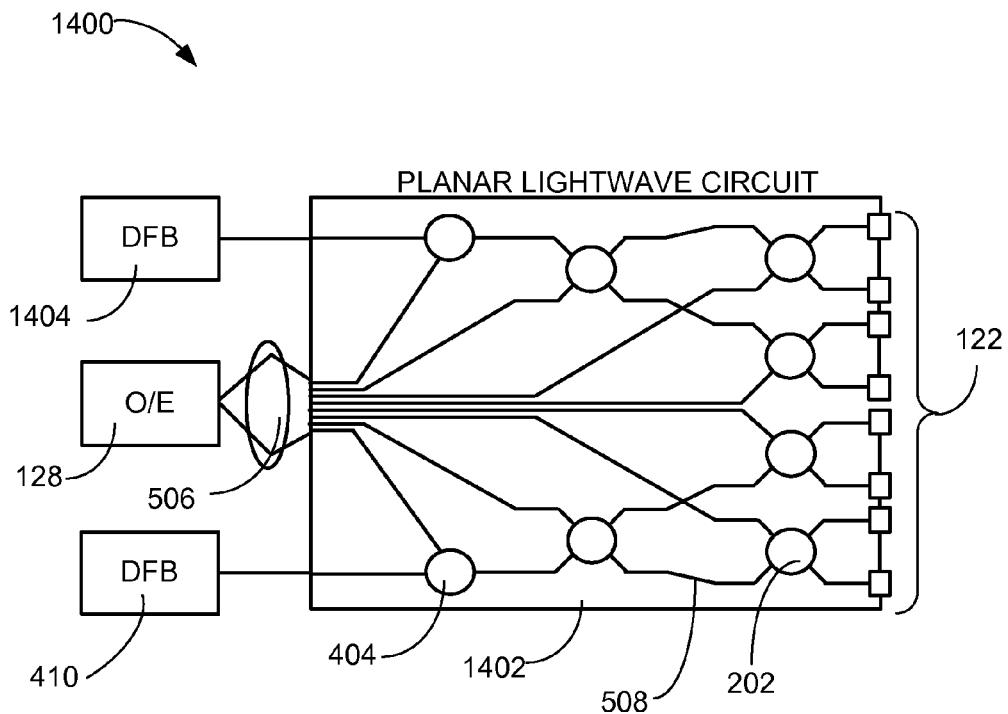
FIG. 14 is a therein is shown a schematic diagram of an optical line terminal transceiver utilizing a 2×8 single-mode optical splitter/combiner in a seventh embodiment of the present invention.

Referring now to FIG. 14, therein is shown a schematic diagram of an optical line terminal transceiver 1400 utilizing a 2×8 single-mode optical splitter/combiner in a seventh embodiment of the present invention. The schematic diagram of the optical line terminal transceiver 1400 depicts a planar lightwave circuit 1402 having the 2×2 single-mode optical couplers 202 arranged to provide the 2×8 single-mode optical splitter/combiner 1400 includes a split transmitter path as an example of the present invention.

The seventh embodiment integrates this invention into the structure of the planar lightwave circuit 1402. The eight-port version integrated onto the planar lightwave circuit 1402 utilizes the 2×2 single-mode optical couplers 202 that are designed to evenly split power from the optical line terminal transmitter 410 at the wavelength, $\lambda_{(Tx)}$. In this example, 1480 nm≤$\lambda_{(Tx)}$≤1500 nm as is required for Gigabit Passive Optical Network (GPON) and Gigabit Ethernet Passive Optical Network (GE-PON) systems. The wavelength division multiplexer 404 preferentially directs some of the upstream signal at 1260 nm≤$\lambda_{Rx}$≤1360 nm to the avalanche photo diode 504, without impacting the flow of the downstream signal through the wavelength division multiplexer 404.

The planar lightwave circuit 1402 structure is designed such that any path from any one of the eight ports in the array of the ONU-facing optical ports 122 to the active surface of the avalanche photo diode 504, travelling through the optical coupler 1202, are equal within a tolerance of 40 ps, which is suitable to enable "on-off keying"—"non-return to zero" (OOK-NRZ) signals at 1.25 Gb/s as are used in the upstream direction of a GE-PON or GPON.

The implementation must take into account not only the path lengths of the waveguides on the planar lightwave circuit 1402, but also the modal dispersion of the optical coupler 1202, in determining the optimal design.

In the seventh embodiment of the invention, the planar lightwave circuit 1402 may have the single-mode optical waveguides 508 with the numerical aperture (NA) of 0.22, a cross-section of 4.5-μm square, and the mode field diameter of approximately 3.7 μm at 1310 nm. The single-mode optical waveguides 508 exit the planar lightwave circuit 1402 in a linear array with 8 μm spacing. Those having ordinary skill in the art will realize that all eight of the single-mode optical waveguides 508 described can simultaneously be coupled to the avalanche photo diode 504 with a 65-μm active area by using a lens or proximity coupling at an efficiency approaching unity.

The design of the single-mode optical waveguides 508 and choice of the optical coupler 1202 must insure that the signal from any one of the ONU-facing optical ports 122, must arrive at the avalanche photo diode 504 within a tolerance of 40 ps with respect to any other optical path from the same one of the ONU-facing optical ports 122. The total delay must also consider any modal dispersion in the optical coupler 1202.

The planar lightwave circuit 1402 is an integrated device, which can be used to split the downstream optical signal from the optical line terminal transmitter 410 and the second OLT transmitter 1404, each transmitting an identical downstream signal, in an implementation of a GE-PON or GPON OLT, into the array of the ONU-facing optical ports 122, while simultaneously combining the optical power from the array of the ONU-facing optical ports 122 and guiding the upstream signal to the avalanche photo diode 504 in a form useful for upstream communications at the bit rate conforming to the passive optical network standards.

The above described configuration may allow the use of existing integrated electronics to perform operations on the downstream signal. Such a configuration may enable use of multiple lower-cost OLT transmitters, when optical amplification in the 1480-1500 nm wavelength range is not an option. Optical amplification of such signals is challenged since they require the existence of an S-band optical amplifier. Semi-conductor optical amplifiers are presently available with saturated output powers up to about 13 dBm, equivalent to perhaps four uncooled directly modulated DFB lasers in parallel in the optical line terminal transmitter 410. S-band erbium-doped fiber amplifiers based on fiber with exceptionally high bend-loss above 1530 nm, have been demonstrated but are not commercially available Such a configuration might enable a faster manufacturing response time to a new product requirement. The additional flexibility provided by the present invention enhances the manufacturability and design margin for products that implement it.

Depending on requirements, the invention can be configured as an integrated device with two optical splitter and one multipath power combiners. This can be generalized to different number combinations.

Figure 15:
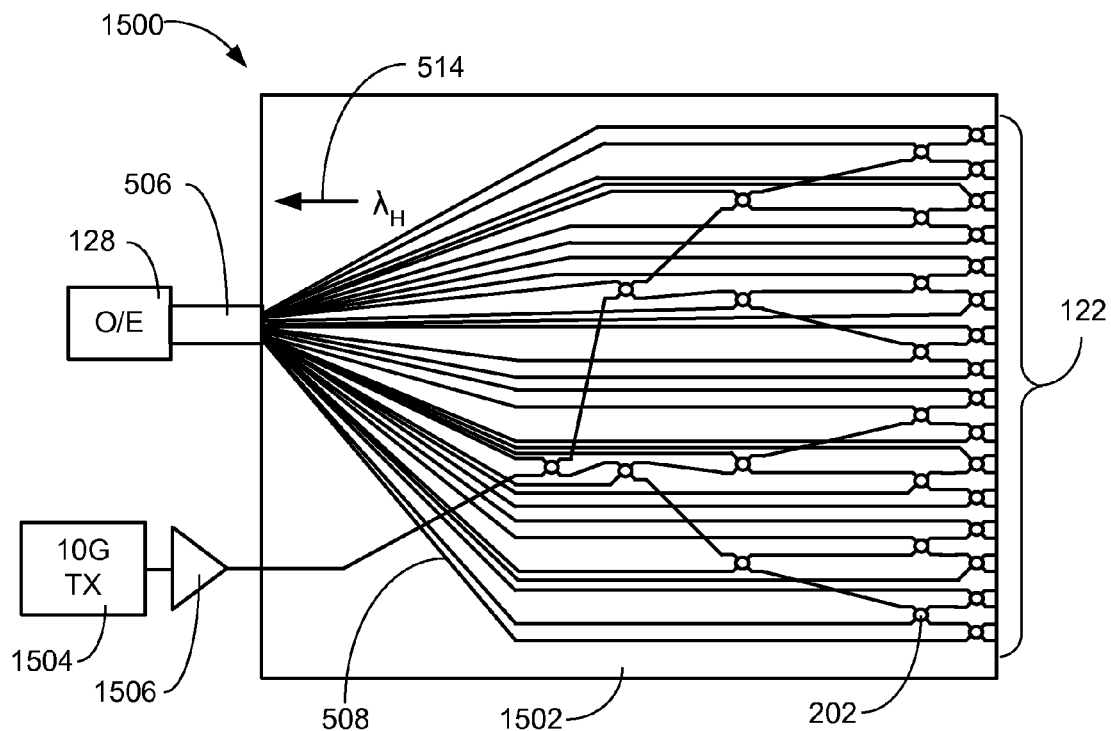
FIG. 15 is a functional block diagram of a 32-port 10-Gb/s PON OLT transceiver in an eighth embodiment of the present invention.

Referring now to FIG. 15, therein is shown a functional block diagram of a 32-port 10-Gb/s PON OLT transceiver 1500 in an eighth embodiment of the present invention. The functional block diagram of the 32-port 10-Gb/s PON OLT transceiver 1500 depicts a planar lightwave circuit 1502 having the 2×2 single-mode optical couplers 202 arranged to provide the 1×32 single-mode optical splitter/combiner 1502 as a further example of the present invention.

The eighth embodiment integrates this invention into the structure of the planar lightwave circuit 1502. The 32-port version integrated onto the planar lightwave circuit 1502 utilizes the 2×2 single-mode optical couplers 202 that are designed to evenly split power from the OLT transmitter 1504 at the wavelength, $\lambda_{(Tx)}$. In this case, in the 1575-1580 nm wavelength window as is defined by both ITU-T and IEEE for use in a 10-Gb/s OLT transmitter.

In the near term, amplification of downstream transmitter for gigabit-speed PONs will be challenged. Next generation PONs, defined by both ITU-T and IEEE have selected a 10 Gb/s OLT transmitter operating in the 1575-1580 nm wavelength window. L-band EDFAs, are well known in the art. A typical L-band EDFA operates over the 1565-1600 nm window with a flat gain response.

Advantageously, for this application an L-band EDFA 1506 need only operate at a single wavelength between 1575 and 1580 nm. A +20 dB constant output power from the L-band EDFA 1506, is well within the bounds of present technology.

The invention configured to facilitate a 32-port 10 G-PON OLT requires the L-band EDFA 1506, which amplifies the transmitter signal to a constant output power of +20 dB, leading to an effective optical power at each port in excess of +3 dB. The harvested-light 514 from 31 of the single-mode optical waveguides 508 are guided to one or more photo-receivers according to the path length restrictions defined in the invention. In the implementation above, the multi-mode optical waveguide 506 having a ~200-μm core diameter guides the harvested-light 514 to a 200-μm diameter active area version of the avalanche photo diode 504.

Based on the standard performance of standard 1×32 planar lightwave circuit-based optical splitters a 17 dB loss for the downstream, the L-band EDFA 1506 providing +20 dB should give an effective launch power from each port of +3 dB. On the downstream, even a high noise figure (NF=10 dB) L-band EDFA would contribute a relative intensity noise (RIN) of −146 dB/Hz to the overall downstream signal. This RIN contributes a negligible penalty on the overall 10 Gb/s downstream link budget.

We can expect that the in the upstream direction, there is 2 dB of loss, meaning that a single instance of the optical line terminal receiver 128 with a sensitivity of −28 dB will translate to an effective sensitivity of −26 dB at each of the thirty-two ports.

The IEEE specification defines a 1.25 Gb/s upstream at a wavelength in the 1270-1290 nm range. The ITU-T specification 2.5 Gb/s upstream also at a wavelength in the 1270-1290 nm range.

On the upstream thirty-one modes can be coupled to a single multi-mode optical waveguide with high efficiency. The overall waveguide design is created such that from any one of the ONU-facing optical ports 122 all paths to the optical line terminal receiver 128 are equivalent to within a tolerance of 20 ps. If the NA of a single-mode optical waveguide is 0.22, and the waveguide cross-section is a 4.5 μm square, the mode field diameter is 3.9 μm at 1270 nm.

Thirty-one of the single-mode optical waveguides 508 can be coupled with low-loss into the optical line terminal receiver 128, which may include the avalanche photo diode 504, of FIG. 5, having a 200-μm active area diameter. Alternatively, the thirty one of the single-mode optical waveguides 508 can coupled into a single multi-mode slab waveguide (not shown) with dimensions of ~200 μm×4.5 μm within planar lightwave circuit 1502. Either the array of thirty one of the single-mode optical waveguides 508 or the single multi-mode slab waveguide can be coupled to the optical line terminal receiver 128 for activating the avalanche photo diode 504 having a 200-μm active area diameter with conventional optics or a 0.4 NA multi-mode optical waveguide having a 200-μm active area diameter APDs with a 0.8 GHz bandwidth are commercially available.

For both the 1.25 Gb/s upstream as used in the IEEE approach, and the 2.5 Gb/s upstream defined by ITU-T, 0.8 GHz bandwidth is insufficient to support burst-mode reception at 2.5 Gb/s. Since a single well characterized receiver is used, one can expect that an electronic equalization circuit (not shown) may be included in the optical line terminal receiver 128 to compensate for the limited bandwidth—perhaps not perfectly, but perhaps enough to justify the ~15 dB improvement in link budget.

The design of the single-mode optical waveguides 508 and choice of the multi-mode optical waveguide 506, including the length of the multi-mode optical waveguide 506, must insure that the signal from any one of the ONU-facing optical ports 122, must arrive at the avalanche photo diode 504 within a tolerance of 20 ps relative to any alternate optical path from the same ONU-facing optical port 122. The delay through any of the single-mode optical waveguides 508 must also consider any modal dispersion in the multi-mode optical waveguide 506.

Figure 16:
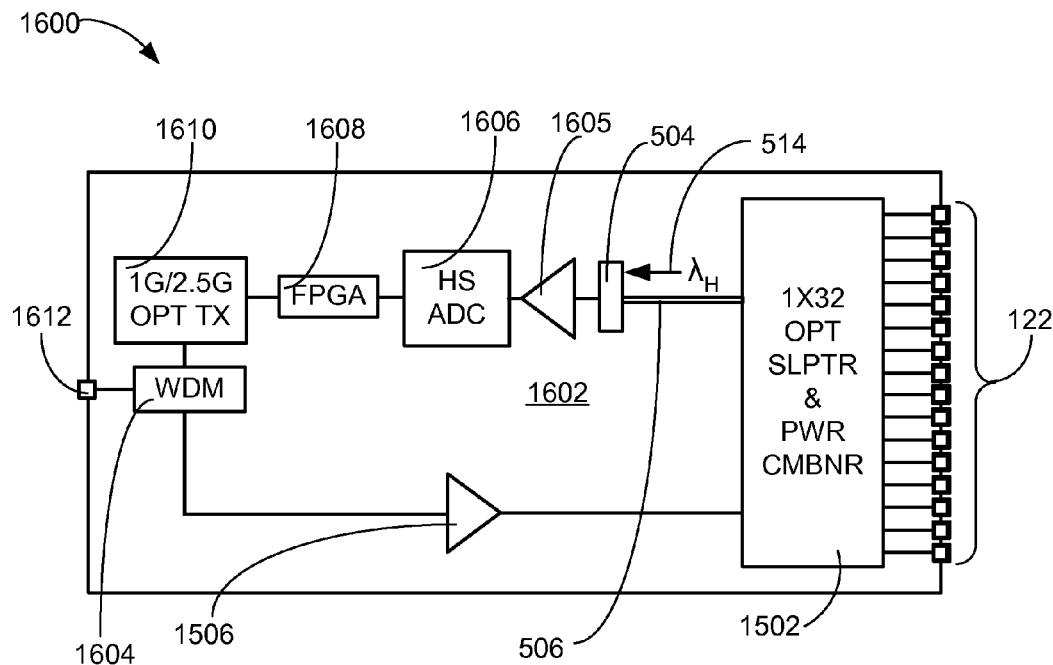
FIG. 16 is a functional block diagram of a 32-port 10-Gb/s PON OLT reach extension system in a ninth embodiment of the present invention.

Referring now to FIG. 16, therein is shown a functional block diagram of a 32-port 10-Gb/s PON OLT reach extension system 1600 in a ninth embodiment of the present invention. The functional block diagram of the 32-port 10-Gb/s PON OLT reach extension system 1600 depicts a 32 port 10-Gb/s PON OLT reach extension board 1602 having the 1×32 single-mode optical splitter/combiner 1502, such as a planar lightwave circuit formed of the 2×2 single-mode optical couplers 202, of FIG. 2, as a further example of the present invention.

The ninth embodiment integrates this invention into the structure of the 32 port 10-Gb/s PON OLT reach extension board 1602 utilizes the 1×32 single-mode optical splitter/combiner 1502 for port access to the ONU-facing optical ports 122. An ONU transmitter 1610 operates at the wavelength, $\lambda_{(Rx)}$, which in this case, in the 1270-1290 nm wavelength window as is defined by both ITU-T and IEEE for use in a 10 G-PON ONU transmitters. The L-band EDFA 1506 need only operate at a single wavelength between 1575 and 1580 nm.

The downstream signal may be regenerated optically by use of an EDFA, semiconductor optical amplifier, or outside-the-box Raman amplification. In alternate embodiments the downstream signal can be regenerated by an optical-to-electronic-to-optical (OEO) process. In such a process, an optical receiver directed toward the optical line terminal, detects the downstream optical signal generating an electrical signal which drives one or more downstream transmitters that are coupled into the OLT-facing downstream port or ports.

A +20 dB constant output power version of the L-band EDFA 1506, is well within the bounds of present technology. The L-band EDFA 1506 will sufficiently drive the down stream port of the 1×32 single-mode optical splitter/combiner 1502.

The multi-mode optical waveguide 506 having a ~200-μm core diameter guides the harvested-light 514 to a 200-μm diameter version of the avalanche photo diode 504. A high speed analog to digital converter 1606 may interpret the output of a trans-impedance amplifier 1605 coupled to the avalanche photo diode 504. The high speed analog to digital converter 1606 may provide a stream of digital bits as input to a field programmable gate array 1608.

A clock may be derived locally or intercepted from the downstream signal. All burst-mode circuit functionality, and additional equalization (e.g. for insufficient receiver bandwidth), even some level of forward error correction (FEC) can be accomplished digitally within the field programmable gate array 1608. In addition digital processing within the field programmable gate array 1608 may allow an ONU transmitter 1610 to send signals back to the central-office based optical line terminal (not shown) at constant amplitude, relaxing dynamic range specifications of the optical line terminal burst-mode receiver (not shown).

The embodiment above could accommodate a change in signal format by adjusting the signal processing performed by the field programmable gate array 1608. The embodiment illustrated above can, for example, accommodate 2.5 Gb/s binary and 5 Gb/s duobinary upstream signaling without any hardware modification.

A single mode fiber connector may be coupled to an OLT-facing optical port 1612 positioned on an edge of the module, and 32 single-mode fiber connectors are located on the ONU-facing side. The number of ports on the ONU-facing side may be adjusted as required by the application. Within the module a three port WDM coupler 1604 can be used to direct the downstream signal to the optical amplifier or optical receiver (in the case of OEO downstream regeneration). The implementer may choose to include an ONU within the module to communicate module status and telemetry information to the optical line terminal One having ordinary skill in the art of PONs, will realize that the module will provide the most utility to the PON network operator if it can operate transparently, and autonomously from the OLT and ONU terminal equipment. Earlier attempts at regenerating GPON upstream signals using an OEO approach, have demonstrated a reduced dynamic range, in part due to the fact that an OLT-located receiver has access to a reset-signal, which is fed to the receiver as a direct electric connection from the OLT MAC (media access control.) Operation of a PON extension system, independent, autonomously, and remotely from the OLT precludes access to the reset signal.

One solution to achieve high-performance independent receiver operation is to utilize a better receiver decision-thresholding and decision-making system compared to the (analog) circuit standard in most OLT burst-mode receivers. One approach, to improve and make more robust the signal reception and discrimination is to sample the upstream receiver signal or signals, and utilize digital signal processing, to add a level of pre-processing or equalization to the signals, and to utilize more flexible and robust decision algorithms than possible in an (analog) electronic circuit.

Advantageously, this processing can also compensate for any non-ideality in the receiver such as penalty from utilizing a larger active area photo-receiver (to capture more upstream light), at the expense of electrical detection bandwidth or modal dispersion from the multi-mode optical waveguide used in some embodiments.

Figure 17:
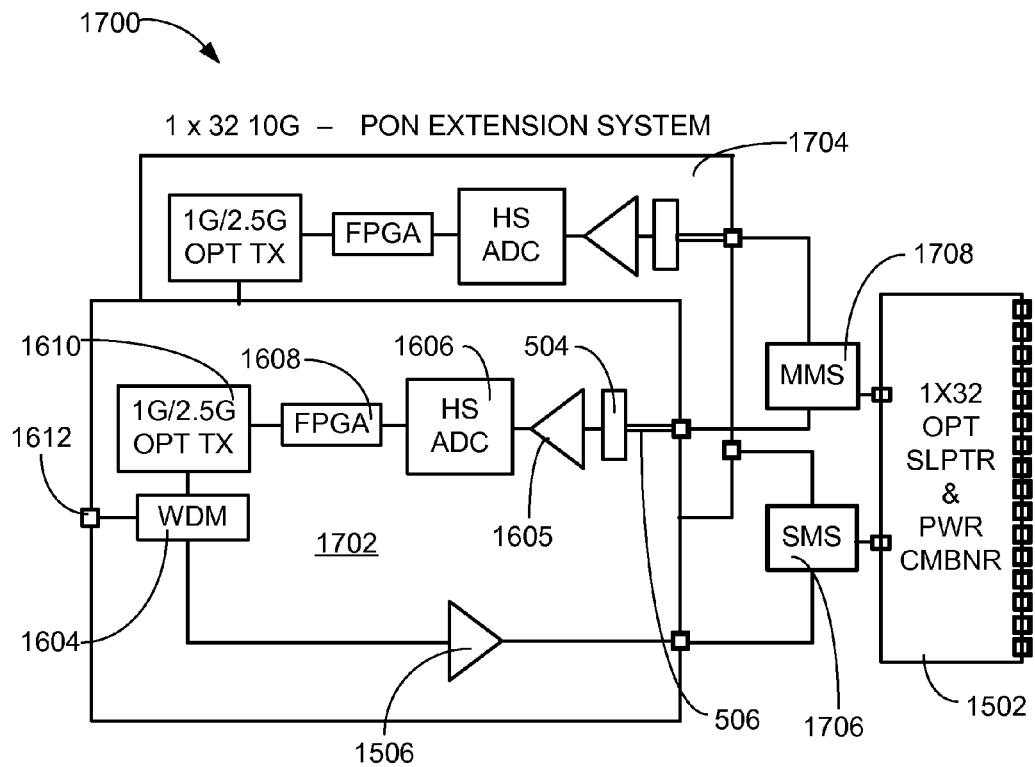
FIG. 17 is a functional block diagram of a 32-port 10-Gb/s PON OLT reach extension system in a tenth embodiment of the present invention.

Referring now to FIG. 17, therein is shown a functional block diagram of a 32-port 10-Gb/s PON OLT reach extension system 1700 in a tenth embodiment of the present invention. The functional block diagram of the 32-port 10-Gb/s PON OLT reach extension system 1700 depicts an external version of the 1×32 single-mode optical splitter/combiner 1502 coupled to redundant versions of the board 1702, such as a pair of the 32-port 10-Gb/s PON OLT reach extension systems 1600, of FIG. 16.

A first optical regenerator 1702 may include the three-port WDM coupler 1604, the L-band EDFA 1506, the multi-mode optical waveguide 506, the avalanche photo diode 504, the trans-impedance amplifier 1605, the high speed analog to digital converter 1606, the field programmable gate array 1608, and the optical transmitter unit 1610. The three-port WDM coupler 1604 may provide the source for the OLT-facing optical port 1612.

A second optical regenerator 1704 is identically configured to have the same functional blocks as the first optical regenerator 1702. The L-band EDFA 1506 may be coupled through a single mode fiber to a single mode switch 1706. An identical connection is made between the second optical regenerator 1704 and the single mode switch 1706. An output of the single mode switch is the downstream port of the 1×32 single-mode optical splitter/combiner 1502.

The first optical regenerator 1702 and the second optical regenerator 1704 comprise a redundant back-up electronic system capable of extending the field serviceability of the 32-port 10-Gb/s PON OLT reach extension system 1700. Due to the completely passive nature of the 1×32 single-mode optical splitter/combiner 1502, its field longevity can be enhanced by having the redundant electronic sets provided by the first optical regenerator 1702 and the second optical regenerator 1704.

A multi-mode connection is made between the upstream port of the 1×32 single-mode optical splitter/combiner 1502 and a multi-mode switch 1708. The outputs of the multi-mode switch 1708 are coupled to the multi-mode optical waveguide 506 of the first optical regenerator 1702 and the second optical regenerator 1704.

With such high N, some redundancy may be desirable. In general, even the most reliable active electronics and electro-optics have much lower reliability compared to passive optical elements. The illustration above illustrates how (active) equipment redundancy and path (to the OLT) redundancy may be accomplished.

Figure 18:
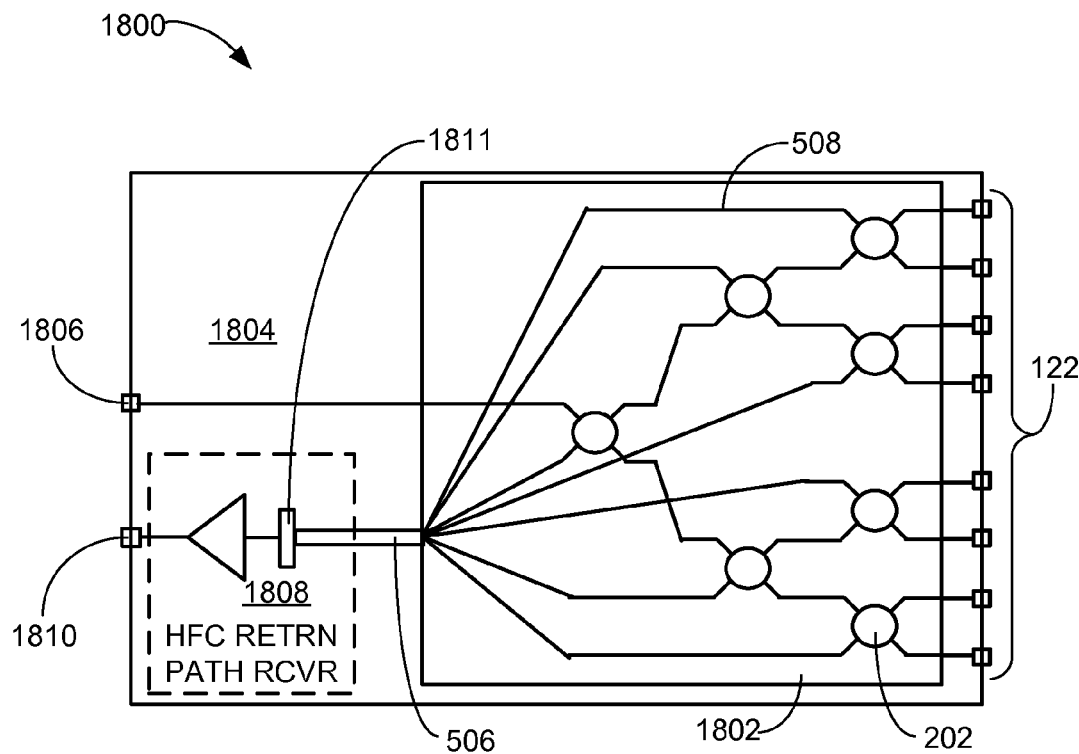
FIG. 18 is a functional block diagram of a hybrid-fiber coax optical network repeater in an eleventh embodiment of the present invention.

Referring now to FIG. 18, therein is shown a functional block diagram of a hybrid-fiber coax optical network repeater 1800 in an eleventh embodiment of the present invention. The functional block diagram of the hybrid-fiber coax optical network repeater 1800 depicts a planar lightwave circuit 1802 having eight of the ONU-facing optical ports 122 and implementing a 1×8 single-mode optical splitter/combiner by coupling the 2×2 single-mode optical couplers 202 by the single-mode optical waveguides 508.

The planar lightwave circuit 1802 may be mounted on a carrier board 1804 with the down stream port of the planar lightwave circuit 1802 coupled to a transmitter port 1806 of the carrier board 1804. A hybrid-fiber coax networks (HFC) return path receiver 1808 is coupled to the single-mode optical waveguides 508 of the planar lightwave circuit 1802 via multi-mode optical waveguide 506. The RF amplifier of the HFC return path receiver 1808 is coupled to the upstream RF output 1810 of the carrier board 1804. The single-mode forward-path optical input port 1806, will connect to a forward-path transmitter (not shown) or an optical amplifier (not shown).

The diagram of FIG. 18 shows an example of an alternate implementation of the invention, which combines the function of several of the modules into a single module with better performance, significantly smaller size, and wavelength independence. The planar lightwave circuit 1802 works as well for a 1310 nm Radio Frequency over Glass (RFoG) return-path signal, as it does with a 1610 nm RFoG return-path signal.

The hybrid-fiber coax optical network repeater 1800 is an integrated forward-path optical splitter/power-combining return-path receiver module for use in HFC and RFoG networks. Apart from its multi-mode optical waveguide input 506, the HFC return path receiver 1808 is well known in the prior art. According to the invention the multiple paths from any of the ONU-facing optical ports 122 to the photodiode 1811 must be equal within a tolerance of 851 ps. The planar lightwave circuit 1802 implementation as illustrated may be implemented with fused-fiber couplers 2×2 single-mode optical couplers 202.

The return-path RF signals are modulated on subcarriers in the f=10-80 MHz range according to the DOCSIS 3.0 specification. It is well known in the prior art that for combining identical RF subcarrier multiplexed (SCM) signals with a time delay of Δt, the carrier-to-noise ratio (CNR) is penalized according to the equation:

$$CNR = CNR_{max} \cos^2(\pi f_{max} \Delta t) \qquad \text{EQ 5}$$

For a maximum 0.1 dB penalty over all frequencies, Δt<851 ps. In glass (n=1.5) this is equivalent to a length of 17 cm. This length tolerance is easily managed even in splicing fibers. Accordingly, although not as compact as a planar lightwave circuit implementation, a fully feasible implementation can be based on splicing 2×2 50/50 single-mode fused-fiber couplers while maintaining a 17 cm length tolerance, according to the invention.

Figure 19:
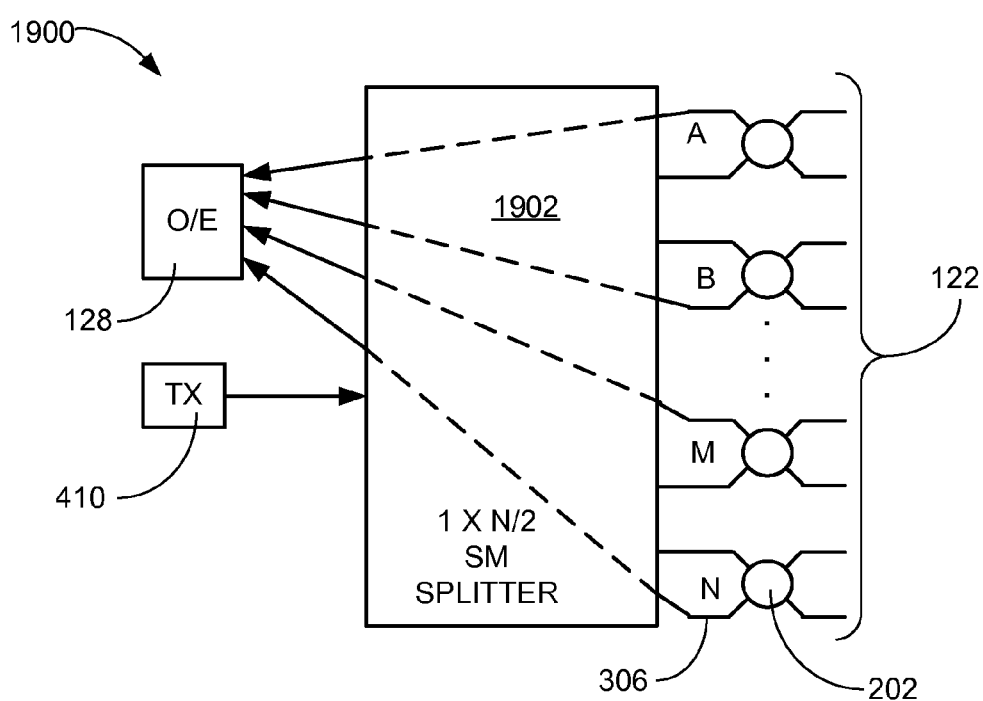
FIG. 19 is a functional block diagram of an optical line terminal transceiver utilizing a 1×(N/2) single mode splitter/combiner, in a twelfth embodiment of the present invention.

Referring now to FIG. 19, therein is shown a functional block diagram of an optical line terminal transceiver 1900 utilizing a 1×(N/2) single mode splitter/combiner, in a twelfth embodiment of the present invention. The functional block diagram of the optical line terminal transceiver 1900 depicts the (N/2) 2×2 single-mode optical couplers 202 having the array of the ONU-facing optical ports 122. Additional optical splitting of the downstream signal is facilitated by a single-mode 1×(N/2) splitter 1902. Each of the harvesting ports 306 on the 2×2 single-mode optical couplers 202 is routed to the optical line terminal receiver 128 for conversion to an independent electrical signal. Since each of the harvesting ports 306 has a unique route to optical/electrical converter 412, the length of its routing is also independent and does not have a critical timing relationship to other routes.

The routing of the first line of the 2×2 single-mode optical couplers 202 to the optical line terminal receiver 128 includes ½ of the total signal content from the array of the ONU-facing optical ports 122 and is greater than or equal to the amplitude of all of the remaining unrealized 2×2 ports within the 1×(N/2) single-mode splitter 1901. Routing only the first line of the unused outputs of the 2×2 single-mode optical couplers 202 will approximate the maximum result within 3 dB and is sufficient to provide reliable and robust communication.

Figure 20:
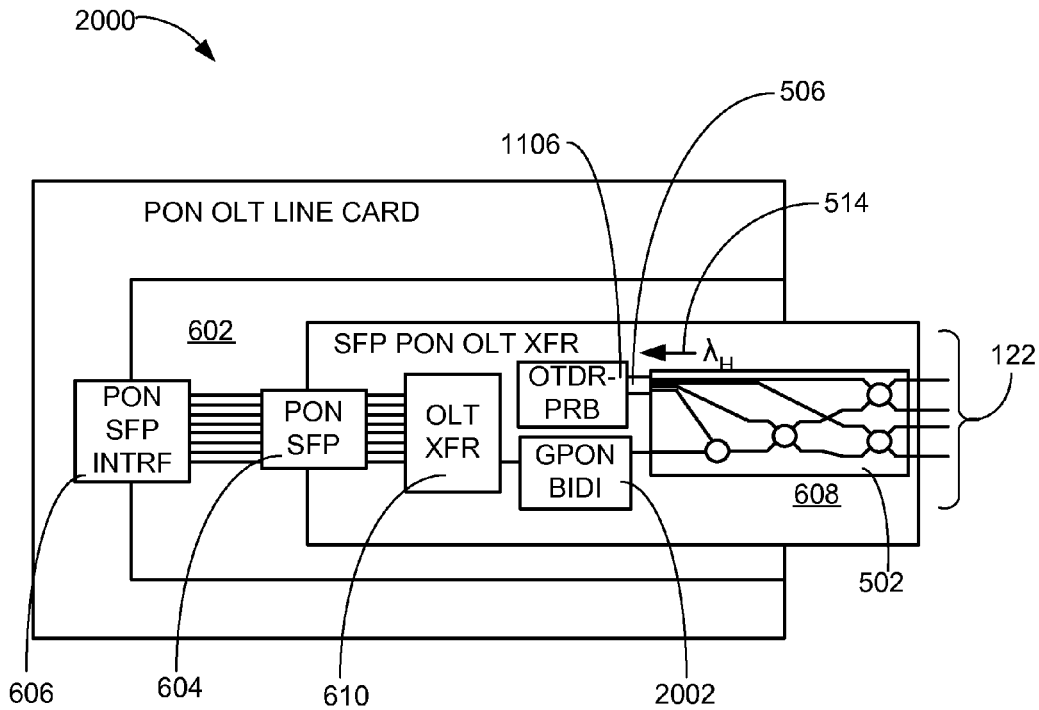
FIG. 20 is a functional block diagram of a passive optical network optical line terminal line card utilizing the planar lightwave circuit.

Referring now to FIG. 20, therein is shown a functional block diagram of a passive optical network optical line terminal line card 2000 utilizing the planar lightwave circuit 502 in an embodiment of the present invention. The functional block diagram of the passive optical network optical line terminal line card 2000 depicts the small form-factor pluggable mechanical interface 602 having the electrical interface 606, such as a small form-factor pluggable industry standard interface for passive optical network support. The electrical interface 606 has an industry accepted specification for mechanical and electrical tolerances.

The small form-factor pluggable module 608 may couple to the electrical interface 606 and the mechanical interface 602 through its electrical interface 604. In an embodiment of the present invention, as an example, the small form-factor pluggable module 608 may include the optical line terminal transmitter electrical circuit 610 that manages the transmission and receiving of the data between the small form-factor pluggable module 608 and the optical network units 124, of FIG. 1, that are distributed along the optical network (not shown). The optical line terminal transmitter electrical circuit 610 may provide an electrical interface that drives an optical line terminal bidirectional optical sub-assembly 2002.

The optical time-domain reflectometer (OTDR) probe 1106 may be coupled to the planar lightwave circuit 502. The presence of the multi-mode optical waveguide 506 connection from the planar lightwave circuit 502 to the optical time-domain reflectometer (OTDR) probe 1106 allows the inclusion of the harvested-light 514 for network monitoring purposes. By using the harvesting technique of the present invention, a −16.3 dB improvement in the signal returned to the optical time-domain reflectometer (OTDR) probe 1106 can be achieved. This significantly improves the sensitivity and accuracy of the readings taken across the single-mode optical fiber 126, of FIG. 1. Advantageously, the optical isolation between the bidirectional optical sub-assembly 2002 and the OTDR probe 1106 is also improved.

Having the optical time-domain reflectometer (OTDR) probe 1106 embedded within the small form-factor pluggable module 608 may provide a real-time analysis capability for determining the condition of the single-mode optical fiber 126 that is coupled between the optical network units (ONU) 124, of FIG. 1, and the ONU-facing optical ports 122 of the small form-factor pluggable module 608. The optical time-domain reflectometer (OTDR) probe 1106 may be used for estimating the length of the single-mode optical fiber 126 and overall attenuation, including splice and mated-connector losses. It may also be used to locate faults, such as breaks, and to measure optical return loss.

It will be understood by those skilled in the art that the invention can be essential to the daily maintenance and support of the single-mode optical fiber 126, of FIG. 1, used in many types of point-to-multi-point optical communications networks, including but not limited those defined by the 10 G-EPON standard, the emerging ITU-T 10 G-PON standard, RF over glass (RFoG) networks, other hybrid-fiber coax networks, and other point-to-multi-point optical (or partially optical) networks.

Figure 21:
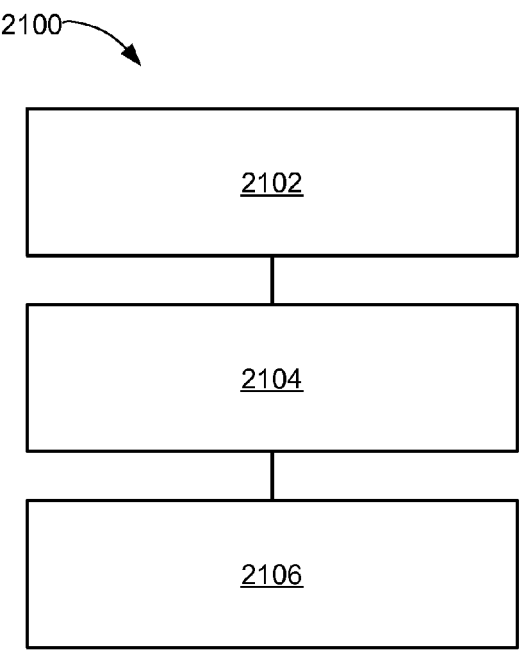
FIG. 21 is a flow chart of a method of operation of an optical network communication system in a further embodiment of the present invention.

Referring now to FIG. 21, therein is shown a flow chart of a method 2100 of operation of an optical network communication system in a further embodiment of the present invention. The method 2100 includes: providing a planar lightwave circuit including: connecting 2×2 single-mode optical couplers in an array for forming a 1×N single-mode optical splitter/combiner, and routing harvesting ports to a receiver for collecting harvested-light, from two or more of the harvesting ports, in the receiver wherein one of more of the harvesting ports is from the 2×2 single-mode optical couplers in a block 2102; transmitting to optical network units through the planar lightwave circuit at a first wavelength in a block 2104; and interpreting a response from the optical network units at a second wavelength through the harvested-light in a block 2106.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an optical network communication system comprising:

providing a planar lightwave circuit including:
  connecting 2×2 single-mode optical couplers in an array for forming a 1×N single-mode optical splitter/combiner, and
  routing two or more harvesting ports to an optical line terminal receiver for collecting harvested-light in the optical line terminal receiver, wherein the harvested light is coupled from two or more distinct optical signal sources and wherein one or more of the harvesting ports are from the 2×2 single-mode optical couplers of the 1×N single-mode optical splitter/combiner, where N is greater than 2, each of two or more of the 2×2 single-mode optical couplers includes a port uncommitted and available to become one of the harvesting ports, and the two or more of the harvesting ports are combined in a multi-mode waveguide on the planar lightwave circuit to form a single composite harvesting port efficiently routing a combined harvested optical signal directly to an optical detector of the optical line terminal receiver, optical paths from an optical network unit facing port through the 2×2 single-mode optical couplers and the multi-mode waveguide to the optical detector are equal to each other within a predetermined time tolerance, and the planar lightwave circuit is an integrated device for splitting a downstream optical signal in an optical line terminal, the multi-mode waveguide guides the harvested-light to a photo diode, the photo diode is coupled to a trans-impedance amplifier, the trans-impedance amplifier generates an output interpreted by an analog to digital converter;
  transmitting to optical network units through the planar lightwave circuit at a first wavelength; and
  interpreting a response from the optical network units at a second wavelength through the harvested-light.

2. The method as claimed in claim 1 further comprising communicating through a single-mnde optical fiber between the optical network units and the planar lightwave circuit.

3. The method as claimed in claim 1 further comprising optically coupling a utility port to an extra and uncommitted port of one of the 2×2 single-mode optical couplers of the 1×N single-mode optical splitter/combiner.

4. The method as claimed in claim 1 further comprising providing an optical coupler between the optical line terminal receiver and the harvesting ports.

5. The method as claimed in claim 1 wherein providing the planar lightwave circuit includes providing the planar lightwave circuit on a small form-factor pluggablc module for increasing a number of optical network unit facing ports.

6. A method of operation of an optical network communication system comprising:
  providing a planar lightwave circuit including:
    connecting 2×2 single-mode optical couplers in an array for forming a 1×N single-mode optical splitter/combiner, and
    routing two or more harvesting ports to an optical line terminal receiver for collecting harvested-light in the optical line terminal receiver, wherein the harvested light is coupled from two or more distinct optical signal sources and wherein one or more of the harvesting ports are from the 2×2 single-mode optical couplers of the 1×N single-mode optical splitter/combiner, where N is greater than 2 including exposing a photo diode to the harvested-light, each of two or more of the 2×2 single-mode optical couplers includes a port uncommitted and available to become one of the harvesting ports, and the two or more of the harvesting ports are combined in a multi-mode waveguide on the planar lightwave circuit to form a single composite harvesting port efficiently routing a combined harvested optical signal directly to an optical detector of the optical line terminal receiver, optical paths from an optical network unit facing port through the 2×2 single-mode optical couplers and the multi-mode waveguide to the optical detector are equal to each other within a predetermined time tolerance, and the planar lightwave circuit is an integrated device for splitting a downstream optical signal in an optical line terminal, the multi-mode waveguide guides the harvested-light to the photo diode, the photo diode is coupled to a trans-impedance amplifier, the trans-impedance amplifier generates an output interpreted by an analog to digital converter;
  transmitting to optical network units through the planar lightwave circuit at a first wavelength including modulating an optical line terminal transmitter; and
  interpreting a response from the optical network units at a second wavelength through the harvested-light including coupling to an optical transceiver module for converting the harvested-light into receiver data.

7. The method as claimed in claim 6 further comprising communicating through a single-mode optical fiber between the optical network units and the planar lightwave circuit including routing single-mode optical waveguides on the planar lightwave circuit.

8. The method as claimed in claim 6 further comprising optically coupling a utility port to an extra and uncommitted port of one of the 2×2 single-mode optical couplers of the 1×N single-mode optical splitter/combiner, the utility port is for supporting connection of network monitoring or diagnostic equipment, or overlay data capacity.

9. The method as claimed in claim 6 further comprising providing an optical coupler between the optical line terminal receiver and the harvesting ports including providing a lens, a reflective coupler, a refractive coupler, or proximity coupling.

10. The method as claimed in claim 6 wherein providing the planar lightwave circuit includes providing the planar lightwave circuit on a small form-factor pluggable module pluggable on an optical line terminal line card for increasing a number of optical network unit facing ports.

11. An optical network communication system comprising:
  a planar lightwave circuit including:
    2×2 single-mode optical couplers coupled in an array form a 1×N single-mode optical splitter/combiner,
    two or more harvesting ports routed to an optical line terminal receiver for collecting harvested-light in the optical line terminal receiver, wherein the harvested light is coupled from two or more distinct optical signal sources and wherein one or more of the harvesting ports are from the 2×2 single-mode optical couplers of the 1×N single-mode optical splitter/combiner, where N is greater than 2, each of two or more of the 2×2 single-mode optical couplers includes a port uncommitted and available to become one of the harvesting ports, and the two or more of the harvesting ports are combined in a multi-mode waveguide on the planar lightwave circuit to form a single composite harvesting port efficiently routing a combined harvested optical signal directly to an optical detector of the optical line terminal receiver, optical paths from an optical network unit facing port through the 2×2 single-mode optical couplers and the multi-mode waveguide to the optical detector are equal to each other within a predetermined time tolerance, and the planar lightwave circuit is an integrated device for splitting a downstream optical signal in an optical line terminal, a photo diode for receiving the harvested-light guided by the multi-mode waveguide, a trans-impedance amplifier coupled to the photo diode, and an analog to digital converter for interpreting an output of the trans-impedance amplifier;

an optical line terminal transmitter for transmitting a first wavelength to optical network units through the planar lightwave circuit; and a second wavelength, from the optical network units, received through the harvested-light.

12. The system as claimed in claim 11 further comprising a single-mode optical fiber between the optical network units and the planar lightwave circuit.

13. The system as claimed in claim 11 further comprising a utility port optically coupled to an extra and uncommitted port of one of the 2×2 single-mode optical couplers of the 1×N single-mode optical splitter/combiner.

14. The system as claimed in claim 11 further comprising an optical coupler between the optical line terminal receiver and the harvesting ports.

15. The system as claimed in claim 11 wherein the planar lightwave circuit is on a small form-factor pluggable module for increasing a number of optical network unit facing ports.

16. The system as claimed in claim 11 wherein:
the photo diode is exposed to the harvested-light; and further comprising:
an optical line terminal transmitter modulated for sending data; and
an optical transceiver module for converting the harvested-light into receiver data.

17. The system as claimed in claim 16 further comprising a single mode optical fiber between the optical network units and the planar lightwave circuit includes a single-mode optical waveguide routed on the planar lightwave circuit.

18. The system as claimed in claim 16 further comprising a utility port optically coupled to an extra and uncommitted port of one of the 2×2 single-mode optical couplers of the 1×N single-mode optical splitter/combiner, the utility port is for supporting connection of network monitoring or diagnostic equipment, or overlay data capacity.

19. The system as claimed in claim 16 further comprising an optical coupler between the optical line terminal receiver and the harvesting ports includes a lens, a reflective coupler, a refractive coupler, or proximity coupling.

20. The system as claimed in claim 16 wherein providing the planar lightwave circuit includes providing the planar lightwave circuit on a small form-factor pluggable module pluggable on an optical line terminal line card for increasing a number of optical network unit facing ports, and the planar lightwave circuit includes a wavelength division multiplexer within the planar lightwave circuit coupled to the 2×2 single-mode optical coupler and coupled to an array of single-mode optical waveguides through the harvesting ports.

21. The method as claimed in claim 1 wherein providing the planar lightwave circuit includes providing the planar lightwave circuit with the optical paths equal to each other within the predetermined time tolerance of 40 pico-seconds or 20 pico-seconds.

22. The method as claimed in claim 1 wherein providing the planar lightwave circuit includes providing the planar lightwave circuit with the optical paths equal to each other within the predetermined time tolerance suitable for reception of 10-gigabit optical data signals.

23. The method as claimed in claim 6 wherein providing the planar lightwave circuit includes providing the planar lightwave circuit with the optical paths equal to each other within the predetermined time tolerance of 40 pico-seconds or 20 pico-seconds for 1.25 gigabit/second optical data signals or 2.5-gigabit/second optical data signals.

24. The method as claimed in claim 6 wherein providing the planar lightwave circuit includes providing the planar lightwave circuit with the optical paths equal to each other within the predetermined time tolerance suitable for reception of 10-gigabit optical data signals for 10 Gigabit/second Ethernet Passive Optical Network (10 G-EPON) or 10 Gigabit-capable Passive Optical Network (10 G-PON).

25. The system as claimed in claim 11 wherein the planar lightwave circuit includes the planar lightwave circuit with the optical paths equal to each other within the predetermined time tolerance of 40 pico-seconds or 20 pico-seconds.

26. The system as claimed in claim 11 wherein the planar lightwave circuit includes the planar lightwave circuit with the optical paths equal to each other within the predetermined time tolerance suitable for reception of 10-gigabit optical data signals.

* * * * *

UNITED STATES PATENT AND TRADEMARK OFFICE
CERTIFICATE OF CORRECTION

PATENT NO. : 9,544,668 B2
APPLICATION NO. : 12/966795
DATED : January 10, 2017
INVENTOR(S) : David Piehler and Anthony J. Ticknor It is certified that error appears in the above-identified patent and that said Letters Patent is hereby corrected as shown below:

In the Claims

Column 27, Claim 2, Line 38, please delete "single-mnde" and insert --single-mode--.

Column 27, Claim 5, Line 49, please delete "pluggablc" and insert --pluggable--.

Signed and Sealed this
Fourth Day of April, 2017

Michelle K. Lee
*Director of the United States Patent and Trademark Office*